(12) United States Patent
Gleim et al.

(10) Patent No.: US 10,885,802 B2
(45) Date of Patent: Jan. 5, 2021

(54) SYSTEM AND METHOD FOR VALIDATING HONEST TEST TAKING

(71) Applicant: GLEIM CONFERENCING, LLC, Gainesville, FL (US)

(72) Inventors: Garrett William Gleim, Gainesville, FL (US); Samuel Rene Caldwell, Mulberry, FL (US); James Mentz, Gainesville, FL (US); Shujian Yu, Wuhan (CN)

(73) Assignee: GLEIM CONFERENCING, LLC, Gainesville, FL (US)

( * ) Notice: Subject to any disclaimer, the term of this patent is extended or adjusted under 35 U.S.C. 154(b) by 255 days.

(21) Appl. No.: 15/226,757

(22) Filed: Aug. 2, 2016

(65) Prior Publication Data

US 2017/0039869 A1 Feb. 9, 2017

Related U.S. Application Data

(60) Provisional application No. 62/202,555, filed on Aug. 7, 2015.

(51) Int. Cl.
*G09B 5/12* (2006.01)
*G09B 7/00* (2006.01)
*G06K 9/00* (2006.01)

(52) U.S. Cl.
CPC .............. *G09B 5/12* (2013.01); *G06K 9/0061* (2013.01); *G06K 9/00604* (2013.01); *G09B 7/00* (2013.01); *G06K 9/00288* (2013.01)

(58) Field of Classification Search
CPC ........... G06K 9/00288; G06K 9/00604; G06K 9/0061; G06K 9/00248; G09B 5/12; G09B 7/00
See application file for complete search history.

(56) References Cited

U.S. PATENT DOCUMENTS

| 5,291,560 A | 3/1994 | Daugman ........................ 382/2 |
| 6,539,100 B1 | 3/2003 | Amir et al. ................... 382/117 |

(Continued)

FOREIGN PATENT DOCUMENTS

| KR | 10-2005-003019 | 3/2005 | |
| KR | 10-2009-0003535 | 1/2009 | |
| WO | WO 2017136931 A1 * | 8/2017 | ........... A61B 5/7267 |

OTHER PUBLICATIONS

Alabort-i-Medina, J., et al., "Statistically learned deformable eye models," *Computer Vision—ECCV 2014 Workshops*, pp. 285-295, 2014.

(Continued)

*Primary Examiner* — Eddy Saint-Vil
(74) *Attorney, Agent, or Firm* — Greenberg Traurig, LLP

(57) ABSTRACT

A method and system is disclosed for validating honesty of a student taking an online test. A camera is used to detect and monitor the test taker's eye movements and eye gaze positions during the taking of the test to ensure the test taker is looking only at the computer display showing the questions and answer choices to the test taker. A microphone is incorporated into, placed on, or in the vicinity of the computer display and the system compares audio received to recorded voice of the test taker to detect another voice. Other voices and eye movement beyond the display screen may be flagged as indicative of dishonest test taking.

11 Claims, 20 Drawing Sheets

(56) References Cited

U.S. PATENT DOCUMENTS

| | | | |
|---|---|---|---|
| 6,711,293 B1 | 3/2004 | Lowe | 382/219 |
| 6,753,919 B1 | 6/2004 | Daugman | 348/345 |
| 8,594,430 B2 | 11/2013 | Cristinacce et al. | 382/181 |
| 8,885,882 B1* | 11/2014 | Yin | G06F 3/00 |
| | | | 382/103 |
| 8,926,335 B2 | 1/2015 | Kumar et al. | 434/322 |
| 2010/0066817 A1* | 3/2010 | Zomet | G03B 25/02 |
| | | | 348/51 |
| 2010/0149488 A1* | 6/2010 | Lo | A61B 3/024 |
| | | | 351/206 |
| 2011/0111384 A1* | 5/2011 | Dietrich | G09B 7/00 |
| | | | 434/350 |
| 2011/0134223 A1* | 6/2011 | Zomet | G02B 27/0018 |
| | | | 348/46 |
| 2011/0228975 A1* | 9/2011 | Hennessey | A61B 3/113 |
| | | | 382/103 |
| 2012/0206407 A1* | 8/2012 | Taylor | G06F 3/0418 |
| | | | 345/174 |
| 2014/0207559 A1* | 7/2014 | McCord | G06Q 30/0242 |
| | | | 705/14.41 |
| 2014/0222995 A1* | 8/2014 | Razden | G09B 7/02 |
| | | | 709/224 |
| 2014/0240507 A1 | 8/2014 | Hsu et al. | 348/159 |
| 2014/0359647 A1* | 12/2014 | Shoemake | H04N 5/23206 |
| | | | 725/10 |
| 2015/0026708 A1* | 1/2015 | Ahmed | H04N 5/23206 |
| | | | 725/12 |
| 2015/0037781 A1 | 2/2015 | Breed et al. | 434/362 |
| 2015/0046161 A1* | 2/2015 | Locker | G09B 7/02 |
| | | | 704/246 |
| 2015/0199005 A1* | 7/2015 | Haddon | G06F 3/013 |
| | | | 345/163 |
| 2015/0213722 A1* | 7/2015 | Nypl | G09B 7/00 |
| | | | 705/12 |
| 2015/0269857 A1* | 9/2015 | Feng | G09B 7/00 |
| | | | 434/353 |
| 2015/0277553 A1* | 10/2015 | Zhang | G06T 7/0002 |
| | | | 382/165 |
| 2016/0029883 A1* | 2/2016 | Cox | G06F 3/013 |
| | | | 351/209 |
| 2016/0035233 A1* | 2/2016 | Breed | G09B 7/00 |
| | | | 345/8 |
| 2016/0041391 A1* | 2/2016 | Van Curen | G02B 27/0172 |
| | | | 345/633 |
| 2016/0063303 A1* | 3/2016 | Cheung | G06K 9/0061 |
| | | | 382/103 |
| 2016/0070105 A1* | 3/2016 | Tannoudiji | G02B 27/017 |
| | | | 345/8 |

OTHER PUBLICATIONS

Cheung, Y.M., et al., "Eye Gaze Tracking With a Web Camera in a Desktop Environment," *IEEE Trans. Human Machine Systems*, vol. 45: 4, pp. 419-429, Aug. 2015.

Cootes, T. F., et al., "Active shape models—their training and application," Computer Vision and Image Understanding, vol. 61:1, pp. 38-59, 1995.

Cootes, T. F., et al., "Active Appearance Models," *IEEE Trans. on Pattern Analysis and Machine Intelligence*, vol. 23:6, pp. 681-685, 2001.

Daugman, J., "How iris recognition works," *IEEE Trans. on Circuits and Systems for Video Technology*, vol. 14:1, pp. 21-30, Jan. 2004.

Hansen, D. W., et al., "In the eye of the beholder: a survey of models for eyes and gaze," *IEEE Trans. on Pattern Analysis and Machine Intelligence*, vol. 32:3, pp. 478-500, Mar. 2010.

Hansen, D. W., et al., "Eye tracking in the wild," Computer Vision and Image Understanding, vol. 98:1, pp. 155-181, Oct. 6, 2004.

Ince, I. F., et al., "A 2D eye gaze estimation system with low-resolution webcam images," *EURASIP Journal on Advances in Signal Processing*, No. 1, pp. 1-11, 2011.

Lee, J. W., et al., "A novel gaze tracking method based on the generation of virtual calibration points," *Sensors*, vol. 13:8, pp. 10802-10822, 2013.

Lowe, D. G., "Distinctive image features from scale-invariant keypoints," International Journal of Computer Vision, pp. 1-28, 2004.

Majaranta, P. et al., "Chapter 3—Eye tracking and eye-based human-computer interaction," Advances in Physiological Computing, Human-Computer Interaction Series, pp. 39-65, S. H. Fairclough and K. Gilleade, editors, Springer-Verlag, London, 2014.

Morimoto, C. H., et al., "Pupil detection and tracking using multiple light sources," Image and Vision Computing vol. 18:4, pp. 331-335, 2000.

Proença, H., "Iris recognition: on the segmentation of degraded images acquired in the visible wavelength," *IEEE Trans. on Pattern Analysis and Machine Intelligence*, vol. 32:8, pp. 1502-1516, Aug. 2010.

Sesma-Sanchez, L., et al., "Design issued of remote eye tracking systems with large range of movement," *Proceedings of the Symposium on Eye Tracking Research and Applications*, pp. 243-246, ACM, 2014.

Tan, T., et al., "Efficient and robust segmentation of noisy iris images for non-cooperative iris recognition," *Image and Vision Computing*, vol. 28:2, pp. 223-230, 2010.

Valenti, R., et al., "Combining head pose and eye location information for gaze estimation,"*IEEE Trans. on Image Processing*, vol. 21:2, pp. 802-815, Feb. 2012.

Valenti, R., et al., "Webcam-Based Visual Gaze Estimation," *Image Analysis and Processing—ICIAP 2009*, pp. 662-671, Springer-Verlag Berlin Heidelberg, 2009.

Xiong, X., et al., "Supervised descent method and its applications to face alignment," 2013 IEEE Conference on Computer Vision and Pattern Recognition (CVPR), pp. 532-539, 2013.

Zhu, J. et al., "Subpixel eye gaze tracking," *Proc. $5^{th}$ IEEE Int. Cont Autom. Face Gesture Recog.*, pp. 124-129, 2002.

International Search Report and Written Opinion, dated Oct. 21, 2016, from corresponding International Patent Application No. PCT/US2016/045181.

* cited by examiner

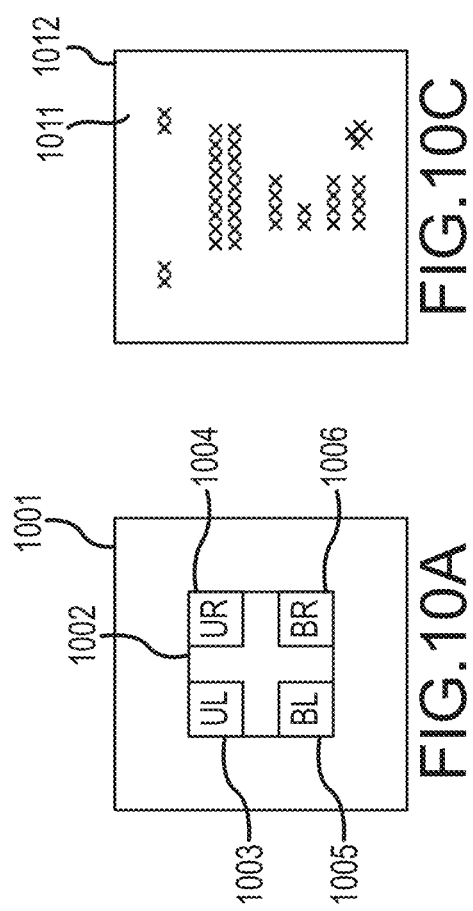
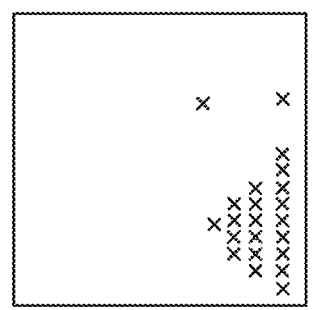
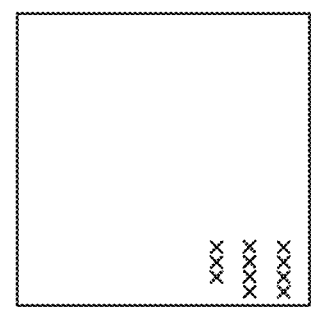
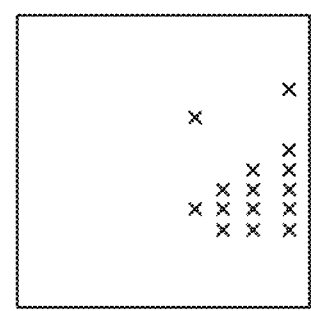
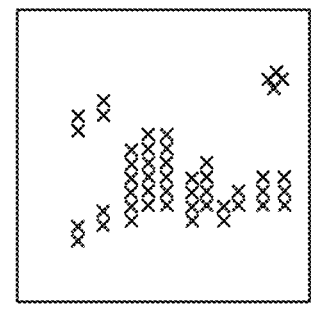
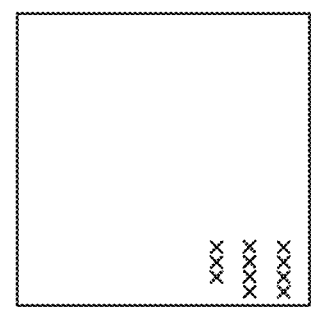

SYSTEM AND METHOD FOR VALIDATING HONEST TEST TAKING

CROSS REFERENCE TO RELATED APPLICATIONS

This application claims the benefit of priority of U.S. Provisional Application Ser. No. 62/202,555, filed Aug. 7, 2015, entitled "Systems and Method for Validating Honest Test Taking," the contents of which is incorporated by reference herein in its entirety.

BACKGROUND OF THE DISCLOSURE

Online educators currently have issues ascertaining whether the student taking an online test, quiz, homework assignment, or exam is really the student registered for the class. In addition, online educators also have difficulty confirming that students taking an online test, quiz, homework assignment, or exam are not cheating by looking at other resources/materials or by interacting verbally with cheating conspirators. Teachers, professors, and academic institutions have solved this problem by requiring students to use an online proctoring company, such as ProctorU, where a $3^{rd}$ party proctor confirms the students' identities and then watches students while they take an online test, quiz, or exam to confirm the proper student is taking his or her own test, quiz or exam. Online proctoring companies require students to turn their video camera on so the proctor can watch them continuously during the test, quiz, or exam. The intent is to confirm that they are not cheating by interacting with other resource materials or cheating conspirators, which are located away from the screen (or monitor) and out of the view of the camera. Also, it can be difficult for a human proctor to notice when students' eyes are gazing in other locations of their respective rooms, especially when they are monitoring more than one student at a time. Moreover, a proctor may not know whether anyone is verbally telling the test taker answers. In summary, the current technological options are labor intensive, not efficient, and can lend itself to bribery where the $3^{rd}$ party allows cheating to occur. Moreover, students often must pay, either directly or indirectly, for each occurrence of a human proctor monitoring their taking of an online test.

SUMMARY OF THE DISCLOSURE

A new novel approach is utilizing a method/system that analyzes eye gazing to determine whether students are potentially cheating by looking away from the computer screen. Image-based eye gaze tracking has attracted many potential applications, spanning from human machine interactions (HMI) to attentive user interfaces. As one of the most salient features within the human face, eye movements and visual attentions are implicitly acknowledged as the way we negotiate with the visual world. Previous image-based eye gaze tracking systems employ one of the two types of imaging techniques: infrared imaging and visible imaging. Although the high-contrast infrared images can significantly improve the resolution of eye regions (hence the accuracy of eye feature extraction), the high cost usually reduces the feasibility of widespread applications. Therefore, visible-image-based eye gaze tracking systems with low cost are preferred for general public use, especially for the purpose of validating honest test taking. This new and novel system is based on the consideration that if a student's eyes start to wander or keep complete static, it is very likely that he/she is cheating. In case of that, the online proctor is provided a warning or alert concerning the test taker's behavior.

Each embodiment of the present disclosure, hereinafter called "GleimCheck" and "GleimDetect", provides assurance that a student using an online learning system is who they are supposed to be. The system disclosed herein is a mechanism to help students reduce education related expenses. An initial verification confirms that a user is who they are supposed to be at the start of a test. An ongoing verification confirms that the same user continues to take the entire test. Collaboration checking confirms that the user taking the test is not collaborating with other test takers. Collaboration checking can occur during the test or exam or can be ascertained after the test. The ongoing verification can incorporate two or more image checks. A webcam captured image is compared to a Reference Image to initially confirm validation of a user, periodically captured again during the examination and verified, and bio-characteristics in the images are measured to confirm that it is a live person and not a photograph. Collaboration is checked by comparing the time, internet location, a physical location of the user to those of other users and browser uniqueness. This can happen while the exam is occurring or it can be determined afterwards using data obtained during the exam process.

An embodiment of a system for confirming test taker identity of a user taking a test during an online test in accordance with this disclosure may include a database containing at least one verified Reference Image of a user scheduled for taking a test, an imaging device such as a camera communicating with the database wherein the camera is operable to capture images of the user periodically during the taking of the test, and a software module connected to the database and to the camera operable to compare each of the captured images to the at least one Reference Image and determine whether the captured image matches the Reference Image. This exemplary system may further include an alarm module communicating with the software module operable to initiate an audible or visual alarm if one of the captured images does not match the at least one Reference Image during the taking of the test.

The visual alarm may be made visible to a user taking the test and/or may be provided to an administrator monitoring the taking of the test. In another embodiment the alarm can be an audio alarm provided to the user taking the test and/or may be provided to an administrator monitoring the taking of the test. The administrator's monitoring (visual and/or audio) can be done during the exam or performed after the exam. The image may be a photograph of the user taken from an official government identification document. The software module may be configured to confirm a match between one of the captured images and the verified Reference Image. If the match between the captured image and the at least one Reference Image is not made, then a second image may be captured and compared to the Reference Image to confirm that no match exists. If the second image also doesn't match the Reference Image then the alarm may be indicated and made available to either the administrator and/or the student in order to correct the condition. One skilled in the art will understand that the system could indicate an alarm on any number of predetermined events, such as 3, 5, or 11 incidents of the captured image not successfully comparing to the Reference Image.

The software module may further be operable to compare at least one biometric parameter obtained from the camera to a previous biometric parameter obtained from a prior captured image. For example, the at least one biometric parameter could be a user movement indicative of the user's pulse.

Alternatively, the biometric parameter could also be a change of color of the user's face indicative of the user's pulse.

An embodiment in accordance with the present disclosure may include a method of validating test taker honesty during administration of a test. This embodiment may include positioning a test taker in front of a computer display connected to a camera, establishing a region of interest in an image taken by the camera of the test taker's face containing at least one eye, and determining the test taker's eye gaze when the test taker is looking at a plurality of different locations on a computer display. The method further preferably includes determining the test taker's eye gaze corresponding to the test taker viewing a boundary of the computer display, monitoring the test taker's eye gaze while the test taker is taking an online test, and setting a flag if the test taker's eye gaze moves beyond the boundary of the display during the test. Determining the test taker's eye gaze may include having the test taker look at each of four corners of the computer display and calculating a position on the display relative to the test taker's eye gaze. The method may also include determining when the online test is complete and resetting the flag if the test was complete when the test taker's eye gaze has moved beyond the boundary of the display.

Another embodiment may include validating test taker honesty during administration of an online test by operations of collecting test taker eye gaze positions of a test taker positioned in front of and looking at a computer display during a predetermined period of time, subtracting a template of expected eye gaze patterns from the collected test taker eye gaze positions during administration of an online test, querying whether the detected test taker eye gaze positions collected during the test deviate beyond a predetermined excursion threshold during the test; and setting a flag for further evaluation if the test taker eye gaze positions exceed the predetermined threshold during the test. This method may further include operations of comparing the collected test taker eye gaze positions during a predetermined period of time to an expected set of collected gaze positions to detect a test taker's change in posture, and de-ghosting the set of collected eye gaze positions to reestablish test taker's expected eye gaze positions.

This method may also include detection of the test taker asking or receiving verbal help from another. In this case, the method may include operations of providing a microphone associated with the computer display during the online test, monitoring audio received by the microphone during the online test, measuring minimum and maximum voice levels over time, comparing the minimum level to a previously selected or measured background noise level, comparing the maximum level to a previously selected or measured maximum noise level, and if the detected volume levels differ from the predetermined volume setting a flag for later evaluation after the test has been completed. Alternatively, the method may include operations of providing a microphone associated with the computer display during the online test, monitoring audio received by the microphone during the online test, detecting a voice in the audio detected, comparing the detected voice to a predetermined voice preferably belonging to the test taker, and if the detected voice differs from the predetermined voice, setting a flag for later evaluation after the test has been completed. The predetermined voice may be determined by asking the test taker to speak a phrase, recording the received voice phrase, and storing the received voice speaking the phrase as the predetermined voice.

The present disclosure also may be viewed as a system for validating test taker honesty while taking an online test. This system may include a computer processor and a database connected to the processor. This database preferably contains predetermined eye gaze patterns that are representative of expected student eye gaze positions during the taking of a test. Such patterns may be generated through sample test taking, or generated by appropriate modeling. The system also includes a computer display communicating with the database and the processor, an imaging device connected to the processor for capturing images of a test taker taking an online test while viewing the computer display, and a software module connected to the database and the imaging device that is operable to detect the test taker's eye gaze position and movement of at least one of the test taker's eyes during taking of the online test and determine whether the test taker, as expected, is only looking at the display during the online test.

In a further enhancement, the system may further include a microphone connected to the display for receiving audio, and a software module connected to the database, for comparing received audio recorded during the test to a stored voice recording of the test taker. This recording may then be used to determine whether a voice other than that of the test taker is being received during the taking of the online test.

DESCRIPTION OF THE DRAWINGS

FIGS. 10A through 10H illustrates a series of exemplary eye gaze patterns.

DETAILED DESCRIPTION

Figure 1:
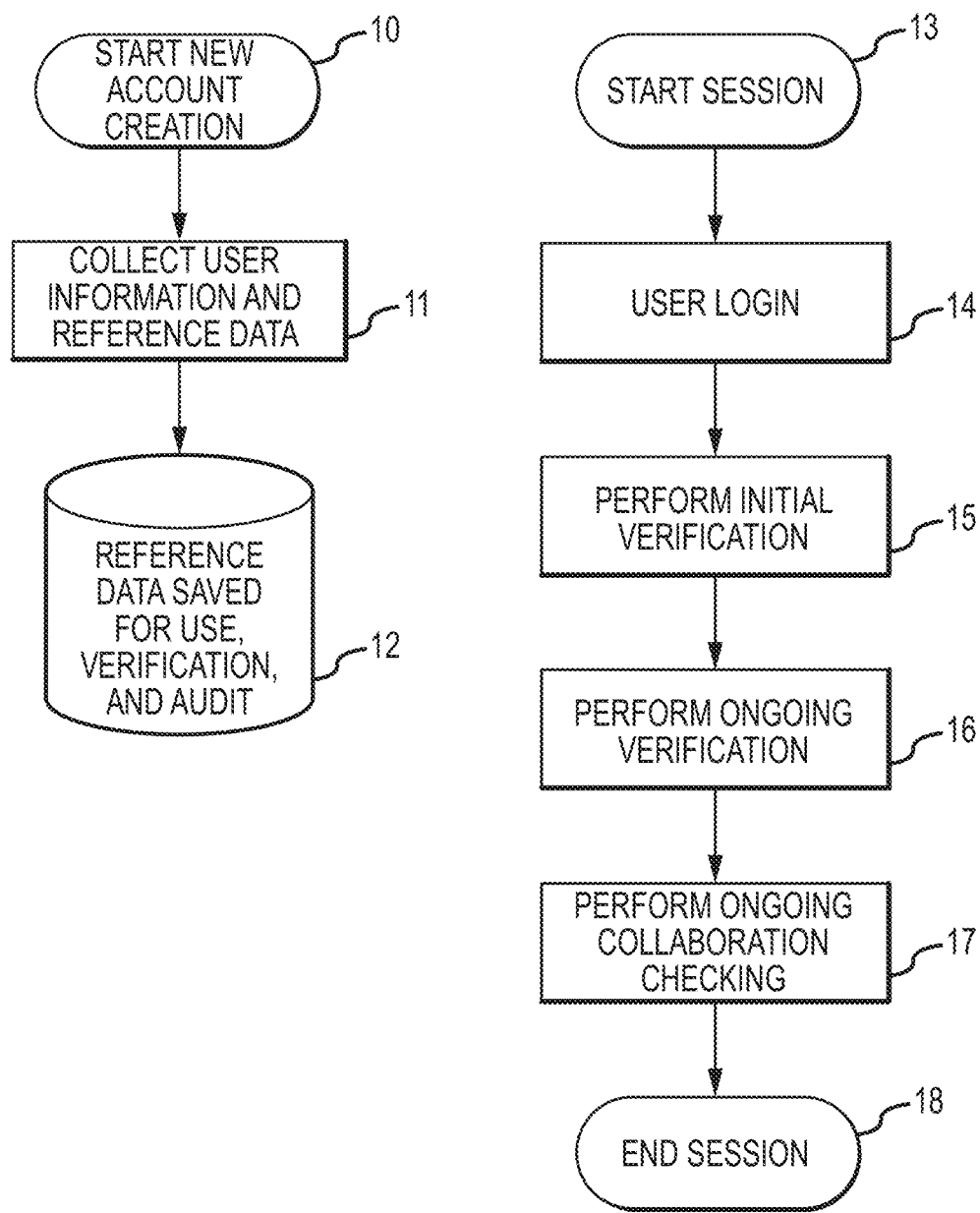
FIG. 1 is flowchart of one embodiment of the process for GleimCheck Honesty Validation.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

An exemplary embodiment in accordance with the present disclosure is called GleimCheck Honesty Validation (FIG. 1). GleimCheck Honesty Validation is composed of three (3) component systems/methods (illustrated in FIG. 18) that are designed to answer, collectively and/or independently, a question: Is this student cheating? GleimCheck Honesty Validation does this by utilizing both the GleimCheck Workflow ("GleimCheck") shown in FIGS. 2A and 2B, the Collaboration Detection Workflow in FIG. 4, and GleimVoiceDetect in FIG. 11. Each of these workflows can be operated independently, together, or any combination within the GleimCheck Honesty Validation system/method.

Figure 2A:
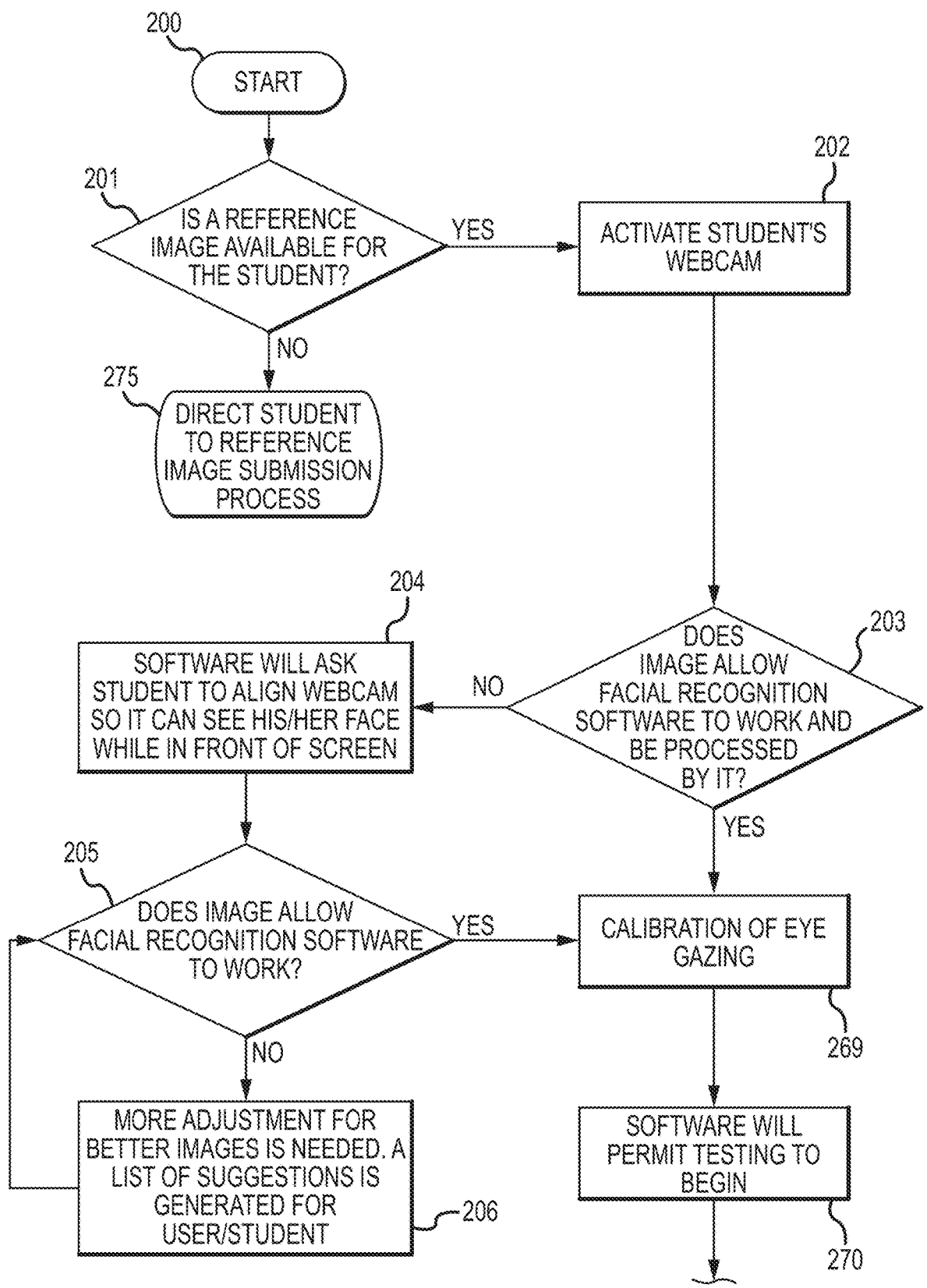
FIGS. 2A and 2B taken together is a flowchart of one embodiment of the process for GleimCheck Workflow of the GleimCheck Honesty Validation shown in FIG. 1.
Figure 2B:
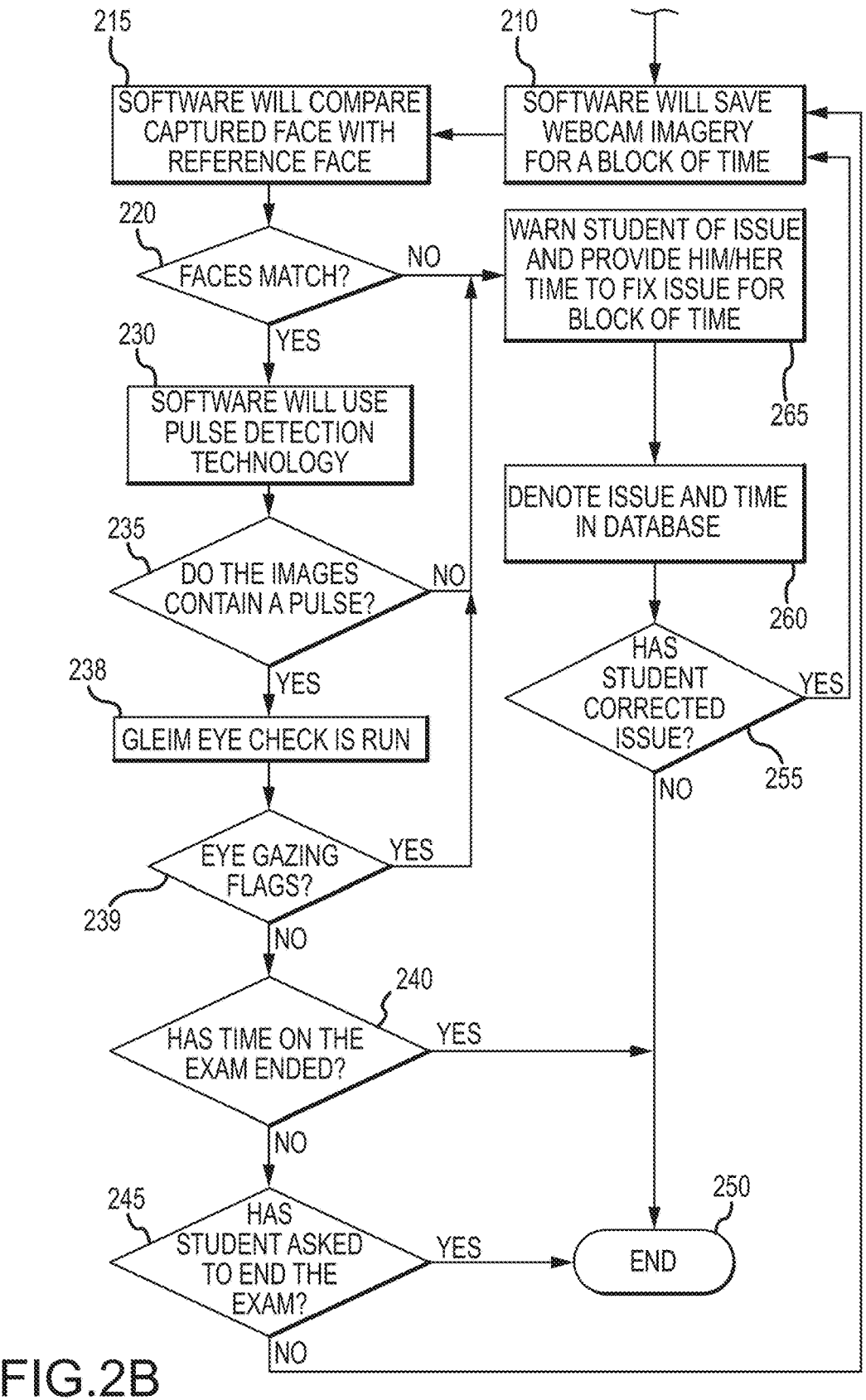

Throughout this disclosure, reference to "GleimCheck" indicates reference to the GleimCheck Workflow, which is depicted in FIGS. 2A and 2B. This workflow includes the workflow in FIG. 3, FIG. 9 and FIG. 12, which are processes within FIGS. 2A and 2B.

Figure 9A:
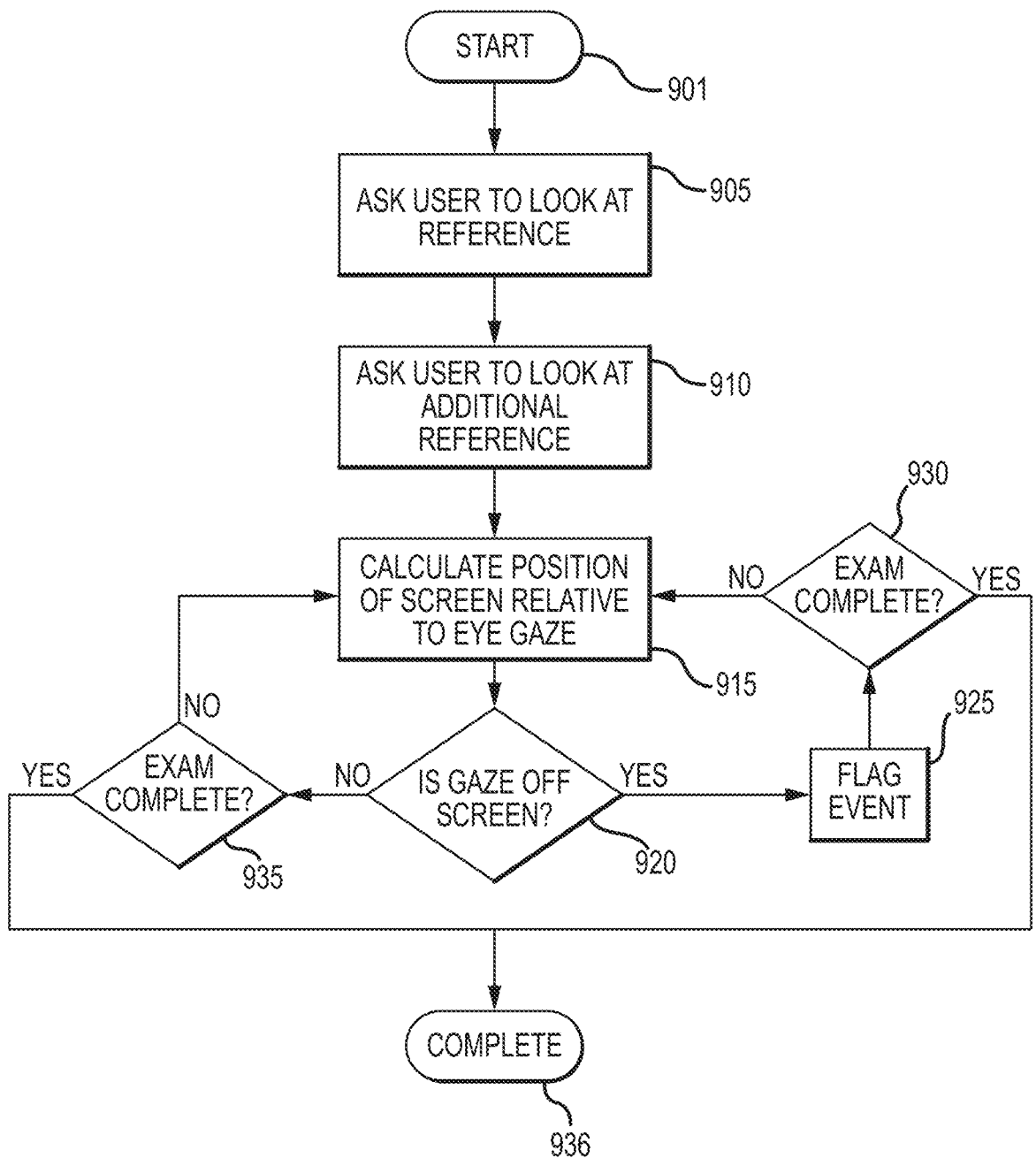
FIG. 9A illustrates the calibrated eye gaze tracking process.
Figure 9B:
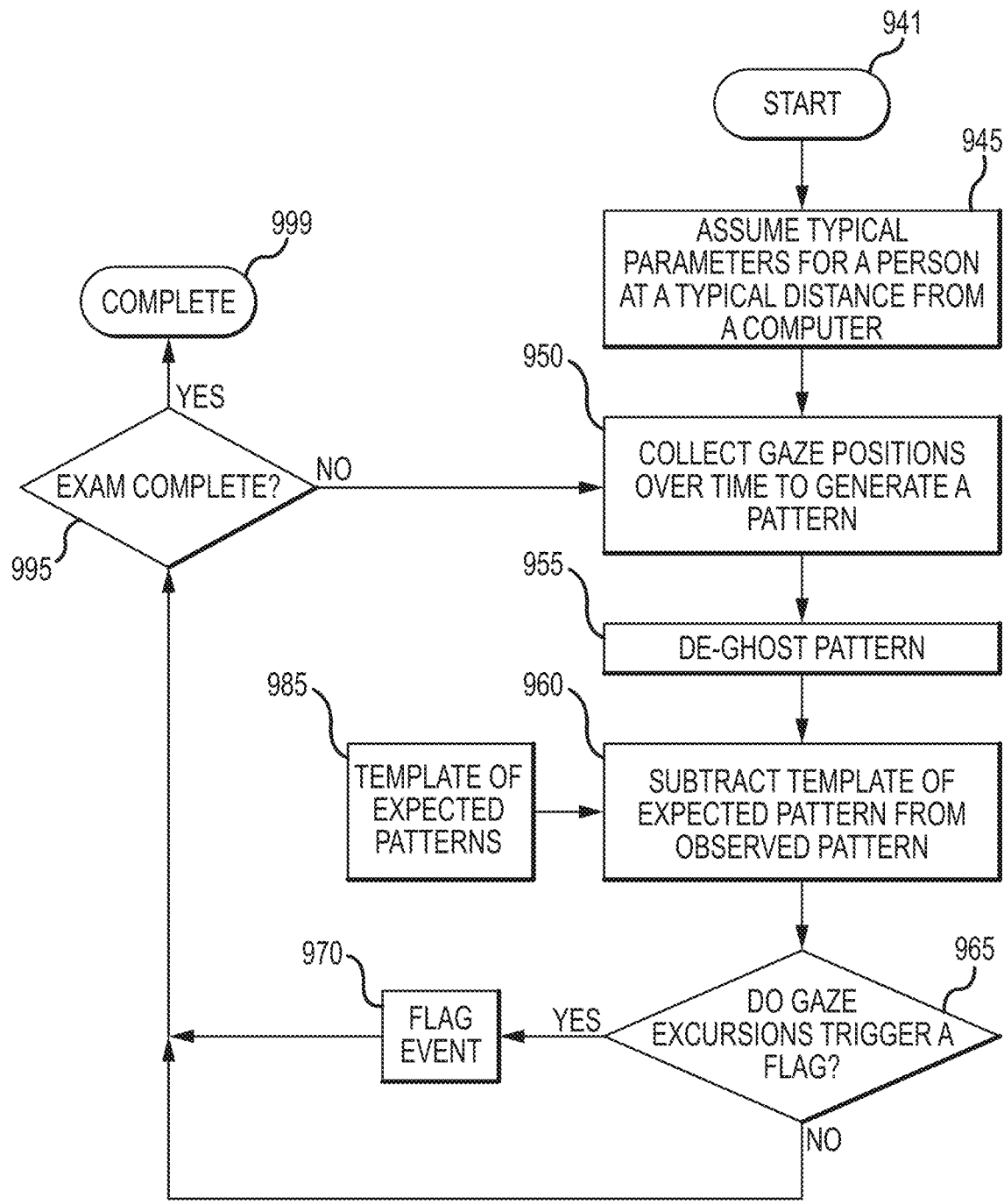
FIG. 9B illustrates the uncalibrated eye gaze tracking process

Throughout this disclosure, "GleimEyeCheck" is an eye gazing method/system, as shown in FIGS. 9A and 9B that can be performed within the architecture of GleimCheck, at the discretion of an administrator. An illustrative example is that a teacher or professor can turn on or off the eye gazing feature.

Within the GleimEyeCheck is a method/system called GleimEyeDetect. GleimEyeDetect is the system/method that allows GleimEyeCheck to identify a users eye(s) and track their movements allowing the system/method to identify where the user is gazing. Specifically, GleimEyeDetect is a system/method that innovatively combines 1) Supervised Descent Method and classical Daugman's integro-differential operator for eye feature extraction, and 2) calibration mechanism which processes binocular feature vectors simultaneously so the system only needs 4 visual target points.

Throughout this disclosure, reference to "GleimVoiceDetect" indicates reference to the GleimVoiceDetect workflow in FIG. 11. This workflow can be used in the GleimCheck Honesty Validation independently or in concert with the GleimCheck Honesty Validation. As an illustrative example, the voice detection could be used on its own, with facial recognition, with pulse detection, with eye gazing, or any combination thereof.

Figure 4:
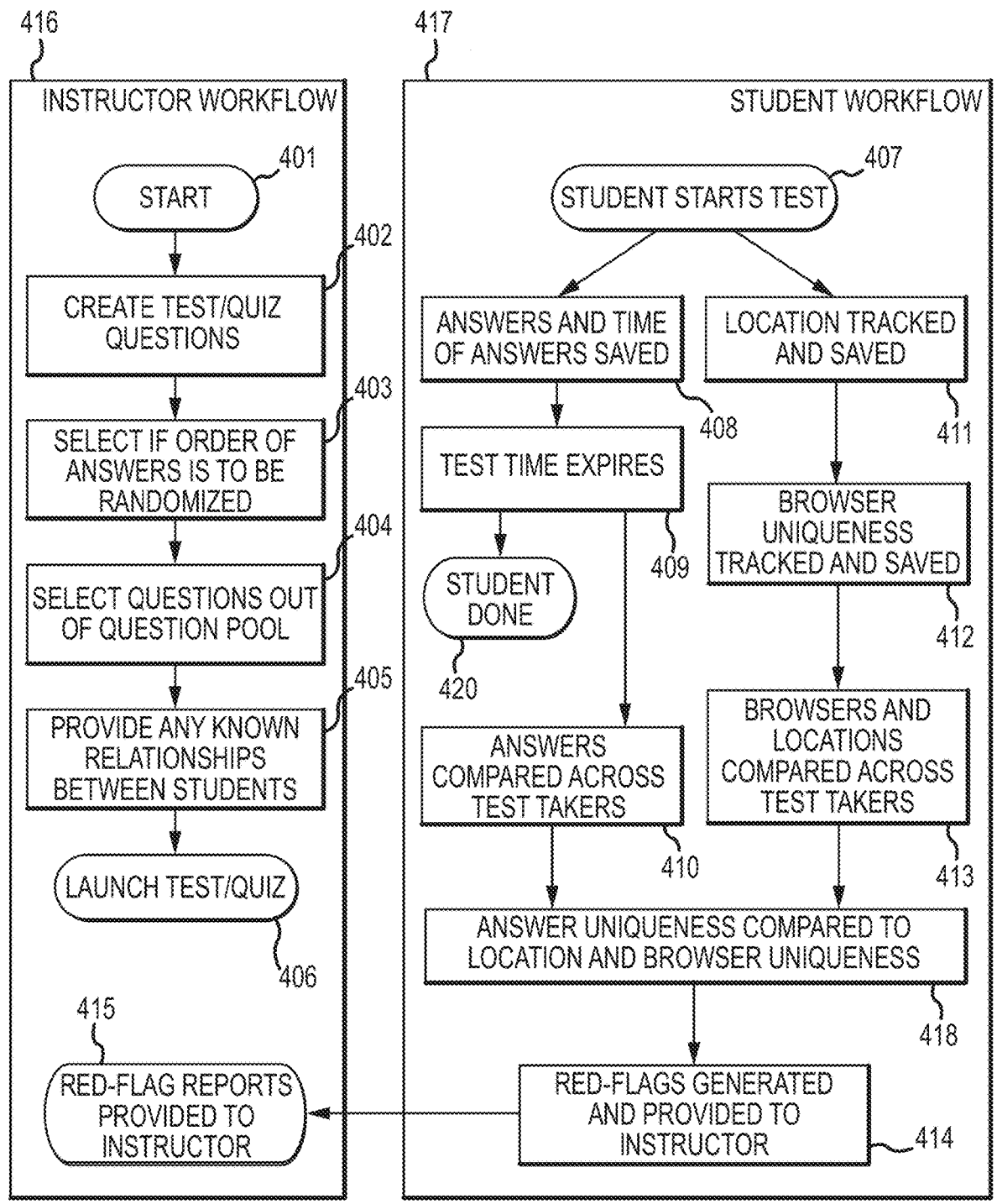
FIG. 4 is a flowchart of one embodiment of the process for a Collaboration Detection Workflow within the GleimCheck Honesty Validation shown in FIG. 1.

Throughout this disclosure, reference to "GleimDetect" indicates reference to the collaboration Detection Workflow, which is depicted in FIG. 4.

An exemplary embodiment in accordance with the present disclosure is called GleimCheck. GleimCheck is a system and method designed to answer a question: Is the person at the computer who he/she says she is? Students participating in online courses typically use devices that incorporate a video camera or can add a camera in a straightforward manner, typically by purchasing an off-the-shelf USB connected webcam. In one embodiment, GleimCheck uses face recognition technology to compare the person in front of the camera to known identified photos. As used in this disclosure, known identified photos will be referred to as "Reference Image(s)". GleimCheck can also use pulse detection technology to make sure that a picture has not been placed in front of the camera. In one embodiment, GleimCheck can be used to ascertain whether a student is gazing outside the view of the camera, which can provide circumstantial evidence that the test taker is using unapproved resources or a third party cheating conspirator. In this embodiment, GleimEyeCheck is utilized to determine the attentiveness of the student at the computer screen. If the student is continually looking off screen or in other areas outside of the screen, it may suggest that the student is getting help from other persons or resources. In addition, if the head and eyes are gazing at a single point without natural movement, it suggests that there is a dummy head in front of the camera and a red flag would alert the proctor or administrator.

In another exemplary embodiment, GleimDetect verifies that each student is within a designated geographic area and identifies students that may be collaborating by comparing their location to the location of other students taking the same test. GleimDetect also compares the uniqueness of answers and incorrect answers. In addition, GleimDetect compares the uniqueness of each student's or user's web browser to ascertain whether students are using the same web browser, same computer, or nearby computers and, thereby, potentially cheating, colluding or conspiring together.

In another exemplary embodiment, GleimVoiceDetect (FIG. 11) verifies that the student is not getting voice communications from another person or persons. In this embodiment, the system/method has a "Reference Voice" of each student (or test taker) and can confirm that any voice is the respective student's voice. In one embodiment, GleimVoiceDetect can flag any voices that are not equal to the Reference Voice. In another embodiment, GleimVoiceDetect can determine and inform the administrator or professor of who the other voices are during the testing.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Throughout this disclosure, reference is made to a test, quiz, exam, examination, etc. It is to be understood that these are synonyms and can be used interchangeably. Furthermore, as used in this disclosure and the claims, the term "test" and "exam" also encompass any task that an on-line student is tasked to complete, such as homework assignments. Moreover, throughout this disclosure, it is to be understood that a student is a generic term for a user or participant taking a test (i.e., a "test taker"). Finally, throughout this disclosure reference is made to a teacher, administrator, instructor, tutor professor, etc. It is to be understood that these are synonyms and can be used interchangeably.

Throughout this disclosure, reference is made to administrators. It is to be understood that administrators can be any type of school employee or education consultant including, but not limited to, principal, dean, head teacher, tutor, professor, academic advisor, academic director, proctor, faculty administrator, media technologist, psychometrician, teaching assistant, network administrator, behavior analyst, secretary, web content administrator, webmaster, etc.

Exemplary embodiments in accordance with the present disclosure involve a method/system of confirming students' or users' identity optionally in real time. One skilled in the art will appreciate and it should be understood that this validation system could also be referred to as an honor system, honor method confirmation system, confirmation method, authentication system, authentication method, endorsement system, endorsement method, verification system, verification method, or characterized via many other similar phrases.

Exemplary embodiments in accordance with the present disclosure involve a system/method of determining where a persons' users', or students' eyes are gazing in real time. One skilled in the art will appreciate and it should be understood that this type of eye gaze system could also be referred to as an eye tracking distraction monitoring, attention monitoring, eye gazing, or glance monitoring, or characterized via may other similar phrases.

In one embodiment of the present disclosure, a picture of a student or user taking a test is taken with a webcam attached to the computer that the student is using to take the test and compared to a known Reference Image such as an image on a previously verified Student ID. Reference Images are either from government IDs, Student IDs, and/or approved images by an administrator or teacher where an administrator or teacher approves the Reference Image as accurately portraying the respective student. Potentially acceptable Reference Images include a Student ID card, a Driver's License, a Passport, an employer-issued identification card, or another government issue type of identification such as a military ID. Alternatively, a Reference Image might be an image/picture taken by the teacher or an administrator. The Reference Images are stored and become available to an administrator of the system, as well as the person who is required to authorize access and use of the system. A privacy statement and information security policy can be implemented to safeguard this information.

In another embodiment of the present disclosure, a picture of a student or user taking a test is compared to a Secondary Image such as a Facebook, Instagram, or Flickr image. Secondary Images may be those that have been tagged by the individual or friends of the individual by way of a social network under the individual's control. For example, an individual may have several images in which they are tagged on Facebook, Google Plus, Flickr, LinkedIn, or another social network that can be associated with the individual's account by logging in through that network's API or by confirming that the user is in control of an email account tied to that address.

Using a Secondary Image as a means of identification may be secure enough for many applications. However, it is generally considered easier to create a falsified account (sometimes called a troll account) on a social network than it is to falsify a government-issued identification document. Thus, the existence of a social network account is considered a less authoritative validation source that the person operating the account is the person pictured in the account. For applications requiring additional security, Secondary Images can be validated by comparison to Reference Images and then used as Reference Images themselves. It may be advantageous to have more reference images so that the system can be used to obtain more Reference Images by authenticating Secondary Images to add to the bank of Reference Images. In another embodiment, a teacher or administrator may approve Secondary Images as being bona-fide Secondary Images and/or approving Secondary Images as Reference Images.

In another embodiment in accordance with the present disclosure, a picture of a student or user taking a test is compared to a Crowd-sourced Image such as an image published to the other test takers to confirm their identities. Crowd-sourced Images may use an individual's existing social network to validate their identity. For example, students may be taking a class online but may still be required to participate in an exam at the same time or during a predetermined set of times. This means that classmates and the instructor are also online, allowing everyone to do a round-robin where each student has a snapshot or video stream from their webcam displayed to other students before the exam begins and each student is required to have a minimum number of confirmations for their identity to be validated. This process can proceed quickly, as each student can see a screen tiled with the images of other students. Each image could have, as an example, up to three options associated with the image, indicating, for example "I know them", "I don't know them", or "that's not them." In another embodiment, a teacher or administrator may approve Crowd-sourced Images as being bona-fide Secondary Images, bona-fide Crowd-sourced Images and/or approving Crowd-sourced Images as Reference Images.

Crowd sourced images can also be used for a complimentary purpose, confirming that an image does not match a known image. Image databases include databases such as WikiMedia Commons and Labeled Faces in the Wild. Several tools exist to provide "reverse image searches" that attempt to match an image to a known image or matching person's face. A student's image can be reverse image searched to make sure that even if the image on the ID matches the test taker and no other images of that test taker's name are available on the Internet, there should also not be other images matching the test taker's image or the test taker's ID but associated with an alternate identity of the test taker. For example, a deficiency of the current ProctorU system (and other companies with similar business models) is that a student can find a substitute (imposter) to take the test, as long as that substitute procures a false ID with the real student's name and the substitute's image. Reverse image searching the test taker would enable the proctor to check for the true identity of the imposter.

In one embodiment, known samples of a user, student, or test taker can be compared to other samples, including Reference Voice, to confirm a student is who they claim to be. In another embodiment, facial recognition in addition to voice confirmation may allow a student or test taker to be validated.

In one embodiment, a student may be considered validated after the video from their webcam can been viewed by a number of other students, such as three other students, and/or may require the administrator to personally validate them. Student privacy regulations such as FIRPA may require the student to opt-in to this form of validation, and students may choose to do so to reduce the time they need to wait for validation. This number, three, could be any number that provides the instructor with a satisfied feeling of knowing that the classmates have verified this particular student accurately. For example, a professor may wish to have x number of students or users confirm an identity or have greater than or less than x number of students or users confirm an identity; where x is variable equal to any positive integer (i.e., a positive whole number).

In one embodiment, the Crowd-sourced Images can be sorted with the least popular being assigned the most validation requests such that all students are validated in a similar period of time. Completely unknown students can have their images displayed to an instructor or proctor who can participate in the validation session.

In one embodiment, a Crowd-sourced Image or the process of confirming an identity using this Crowd-sourced Honesty Validation does not need to be limited to the group of students taking a common test. The process can be expanded such that anyone in the individual's social network can be used to perform validation, such as a colleague from a previous class, a previous teacher, or even a family member.

In an exemplary embodiment, the camera used can be a light-field camera, which is also known to one in the art as a plenoptic camera. A light-field camera often uses a microlens array to capture 4D light field information about a scene. They gather more light field information than traditional cameras and can be used to improve the solution of computer graphics and computer vision-related problems. In one embodiment, a benefit to light-field cameras is that images taken by them can be refocused after they are taken. In a further embodiment, the system or method can refocus the image many times to ascertain if there is more than one face in the frame, which may be out of focus and not ascertainable in the initial (or primary) picture image. Moreover, each time the image is refocused, the system or method can analyze the image against known devices, such as tablets, smartphones or augmented reality glasses, to ascertain whether these images are in the area of the student taking an exam.

One advantage of utilizing a light-field camera compared to a pinhole camera or other camera with the very large depth-of-field typical of small webcams, is that even when a webcam provides an image with a very large depth-of-field where the entire image is in focus, the webcam does not provide any information about the depths of the subject, regions of interest, or background of the image. A plenoptic camera can directly measure if it is capturing the flat image of a photograph placed in front of a camera or a curved subject that is set apart at a different distance than the background.

In one embodiment of this disclosure, instead of video or images, a 3D scanner could also be used. While cameras and microphones are built into each individual's computer, phone, or other electronic device, identity validation may also take advantage of 3D scanners. 3D scanners are devices similar to cameras that associate a depth with each area of the image, such that a three dimensional model of the object of interest can be generated. An object of interest is typically a human head. One skilled in the art will understand that 3D scanners can replace cameras or video cameras.

In another embodiment of the present disclosure, a picture of a student or user taking a test is taken with a webcam attached to the computer that the student is using to take the test and an eye gazing process called "GleimEyeCheck" validates that the test taker is not looking elsewhere off the screen, which could be a sign that he or she is cheating (e.g., using unauthorized resources or working with a cheating conspirator). In one embodiment, the webcam could capture natural images (i.e., a normal off-the-shelf webcam). In another embodiment, the webcam could be an infrared camera. By analyzing eye gazing, it solves a deficiency in the current marketplace where online proctors need assistance in determining if students are looking elsewhere. With the number of students versus a single proctor, it can be overwhelming for a proctor to ensure academic honesty for an entire exam.

FIG. 1 shows a general embodiment of how this system/process begins. The process begins in process operation 10 in which a student or user creates an account. Control then transfers to operation 11. In process operation 11, the student or user submits Reference Images that will be used to confirm his or her identity. Optionally provision may be made for a professor or administrator to confirm or reject these submitted Reference Images. In one embodiment, process operation 11 could also include the operations and queries (901 through 936) found within FIG. 9A and discussed below. Alternatively, another embodiment of process operation 11 could also include the GleimEyeDetect workflow including process operation 1230. In another embodiment, process operation 11 could include the process operations 1101 through 1119, which are in FIG. 11A and discussed below. Control then transfers to operation 12.

In process operation 12, the system stores this Reference Image for use throughout the session and, potentially as a reference in future sessions. In one embodiment, process operation 12 stores the calibrated eye gazing data that was generated in process operation 11 via the process described in FIG. 9A and FIG. 12 (process operation 1230) In another embodiment, process operation 12 stores the Reference Voice described in FIG. 11A.

The process in FIG. 1 continues with the start or initiation of a new session. This is depicted as process operation 13 wherein the session begins. Control then transfers to operation 14. In process operation 14, the student or user logs into the system with a user name and password in a conventional manner known in the art. Control then transfers to operation 15.

In process operation 15, the system performs an initial check to verify the user's identity. In addition, one embodiment allows for this initial check to verify the user's identity and also perform process operations 901 through 936 of FIG. 9A and/or FIG. 12 (process operation 1230). In this instance process operations 901 through 936 and 1230 could be conducted before or after the initial check to verify the user's identity. In another embodiment, process operations 1101 through 1119 of FIG. 11 could be operated within process operation 15. In this instance the initial check to verify the user's identity, the eye gazing calibrated process, or the Voice Reference could be operated in any order or combination. Control then transfers to operation 16.

Process operation 16 can include the operations of GleimCheck, Gleim Detect, GleimEyeCheck, and GleimVoiceDetect. GleimCheck often incorporates both the facial recognition (process operation 215) and pulse detection (process operation 230). It can also incorporate GleimEyeDetect. However, in an embodiment of process operation 16, process operations 215, 230 or GleimEyeDetect could be turned off, so GleimCheck is only a facial recognition or pulse detection system/method. Therefore, process operation 16 can incorporate facial recognition, eye gazing, pulse detection, collaboration detection, and voice detection in any combination.

In an exemplary embodiment, in process operation 16, the system performs ongoing, or periodic, verification that the authorized user is still operating the system, e.g. that the user has not logged in and then walked away and left someone else to continue the session. As an illustrative example, the system/method can confirm each student has a pulse and is not using a photograph to trick the system/method. In another embodiment, process operation 16 can be used with GleimEyeCheck (discussed below) and/or GleimVoiceDetect (discussed below). In this embodiment, process operation 16 performs ongoing, or periodic, verification that the student's eyes are not gazing off-screen as well as verifying no other voices can be heard except the respective student's voice.

In another embodiment, process operation 16 includes GleimEyeCheck which utilizes the operations within FIGS. 9A, 9B, 10 and 12. An illustrative example is to confirm whether a test taker or student is using unauthorized resources (including cheating conspirators) outside the view of the camera. For example, GleimEyeCheck can help ascertain whether a student keeps looking to their lower left indicating that a book or tablet is lying on their floor to their left, so the student can cheat by referencing unauthorized resources. This activity can be flagged and an administrator or teacher can investigate further.

In another embodiment, process operation 16 includes GleimVoiceDetect. As an illustrative example, GleimVoiceDetect can alert an administrator or teacher whether the student is listening to other person or persons who are potentially providing answers or comments to the student. Control then transfers to operation 17.

In process operation 17, the system performs ongoing collaboration checking (i.e., Gleim Detect) to confirm, check or detect if the user is collaborating with another user. In one embodiment, these checks continue until the end of the session. Alternatively, these collaboration checks could be conducted after the student/user has completed the test. In such an alternative embodiment, batch processing could be done at one time after every student has taken the examination, or at intervals throughout the examination. Many online exams include provisions to provide the student with an option of taking the exam over a period of time, such as a few days, so students can choose the exact time they take their exam, such as a 2-3 hour exam. Control then transfers to session terminate operation, which is process operation 18.

An embodiment of the steps involved in the process operations of process operations 14, 15 and 16 just mentioned are explained in more detail in the flow diagram of FIGS. 2A and 2B. The GleimCheck software uses face recognition software to match the image in the camera to the known good images (i.e., Reference Images). FIGS. 2A and 2B together show the GleimCheck face recognition workflow, and GleimEyeCheck workflow.

In the process 200, a student begins GleimCheck by logging into the system. This log in may be accomplished by a user submitting a username and password or by an alternate session initiation method. This equates to Operation 14 in FIG. 1. Operations 201-206 in FIG. 2A correspond to operation 15 in FIG. 1. Operations 210-270 in FIG. 2B correspond to operation 16 in FIG. 1.

In an embodiment of process 200, an alternate session initiation method may be initiated by another session, which is already initiated. In particular, a student may already be logged into a Learning Management System operated by a school or educational services provider. Two examples of learning management systems (LMS) for online education available today are Gleim U from Gleim Conferencing LLC and "Blackboard" by Blackboard Inc. The educational services provider could use the existing session and user information to launch a GleimCheck Honesty Validation Session and/or a GleimCheck Session, typically by having the student follow a link to open a GleimCheck session in another window, another browser tab, as a new page, or as a new option in an existing browser tab or browser window.

In an embodiment of process 200, session initiation may also be performed by checking a biometric identity, such as a fingerprint or a voice. This process may use the same fingerprint or biometric reader as other services. However, while many fingerprint scanners provide authentication that is local to a device, GleimCheck may store the biometric identification data, such as a fingerprint or voice, or metadata about the biometric identification in the cloud, so that the GleimCheck information is used as Reference Information that can be validated by comparison against other Reference Information. The result is that a fingerprint is a portable form of identification that a GleimCheck user can use to start a session anywhere and be validated by information stored on a server, the fingerprint check is not limited to use only on a specific device.

In process query 201, the system checks if a Reference Image is available for a student. In another embodiment, the system can also check for eye gazing information. If a Reference Image (or eye gazing information) is available, then the system moves to process operation 202. If no Reference Image (or eye gazing information) is available, then the system moves to process operation 275. It is important to underscore that process query 201 can check for a Reference Image, eye gazing calibration information, or both.

In process operation 275, the student is directed to create a Reference Image using the image submission process, which is depicted in FIG. 1 as process operation 11. In another embodiment, the student is directed to process operations within FIG. 9A (and/or process operation 1230) so the GleimEyeCheck system can calibrate. Control then reverts back to query operation 201.

When the answer in query operation 201 becomes a yes, control transfers to operation 202. In process operation 202, the student's webcam or other image scanner is activated. Control then transfers to query operation 203.

In query process 203, the system/method queries whether the image allows the facial recognition software to work and be processed by it. For example, if no, this may mean that the lens has too many scratches, the lens needs to be cleaned, or that the individual is not properly in front of the camera. If yes, then method/process moves to process operation 269. If the image will not allow the facial recognition software to work, then the method/process moves to process operation 204.

In another embodiment, query process 203 can also query whether the GleimEyeCheck will work with the images being supplied by the webcam.

In process operation 204, the software directs the student to align the webcam so that the software can correctly process the image. When an image is being used by a system and/or method, the verification system or method may need to encourage the user to align the camera so that the image can be processed by the verification method or system. A webcam image of the user's face is then taken. Control then transfers to query operation 205. Note that the webcam is being used as an example here for convenience. It is to be understood that any imaging device including, but not limited to, webcams, camera, 3D scanners, infrared camera, light-field camera, plenoptic camera, or video camera, could be substituted for a webcam when referenced above. In another embodiment, process operation 204 can also confirm that GleimEyeCheck (or GleimEyeDetect) works with the images (or video) and the user does not need to realign their position (or head position) in front of the camera. This can include instructions to reposition the head horizontally (i.e., left-right), reposition the head vertically (i.e., higher-lower), posture, and distance between the webcam and the user.

In query process 205, the system/method queries whether the acquired image will allow the facial recognition software to work and be processed by it. If yes, then control of method/process moves to process operation 270. If the image will not allow the facial recognition software to work, then control transfers to process operation 206. In another embodiment, query process 205 also includes querying whether GleimEyeCheck works and can be processed by it.

In another embodiment, query process 205 can also query whether the GleimEyeCheck or GleimEyeDetect will work with the images being supplied by the webcam.

In process operation 206, the system or method may ask for additional changes to make it easier for the software to process the image. Adjustments may include lighting, changes in lighting, posture, changes in posture, distance between the user and the camera, camera angle, camera sensitivity, refresh rate, or resolution, cleaning the camera lens, or even replacing the camera. These parameters may be specific to each session because of changes in internet bandwidth, lighting, processing power, physical location, or other conditions. The camera may also choose to display a smaller portion of the image to the user, such as a box in the center of the entire image capture area, while capturing a larger part of the image. One reason to do this is to detect the method of cheating in which the camera is positioned to place a collaborator or cheating device just outside of the displayed image. By displaying just a portion of the image, the camera may capture the collaborator or cheating device in the larger image. After the camera, depth sensing camera or other image capture device has been properly configured, the process returns to process query 205 until a satisfactory "yes" response in query operation 205 is generated, and control transfers to operation 269. In another embodiment, process operation 206 can also confirm that GleimEyeCheck works with the images (or video) and the user does not need to realign their position (or head position) in front of the camera. This can include instructions to reposition the head horizontally (i.e., left-right), reposition the head vertically (i.e., higher-lower), posture, and distance between the webcam and the user.

In process operation 269, the system or method runs operations 901 through 907, which are illustrated in FIG. 9A. After this is complete, control transfers through operation 270 to operation 210. In another embodiment, process operation 269 may utilize process operations 1205 through 1240 in FIG. 12 and discussed below.

Operation 270 begins the test taking process for a particular user who has successfully logged in, created a suitable Reference Image or such a Reference Image has been identified and retrieved for use during the on-line testing session. Control then transfers to operation 210.

In process operation 210, images can be processed as video images in blocks of one or more video frames in a process described in more detail with reference to the architecture shown in FIG. 3. Control then transfers to process operation 215.

In process operation 215, the method/system then compares the face in the Reference Image to the face in the captured image to check if they match. This system may incorporate open source face recognition software. A likely source of open source software is OpenBR from openbiometrics.org. On the other hand, an embodiment could utilize "Enhance $(PC)^2A$ For Face Recognition With One Training Image Per Person" by S Chen, et al or "Face recognition with one training image per person" by J Wu, et al. One skilled in the art understands that any number of facial recognition versions can be used including, but not limited to, other proprietary and non-open sourced methods of face recognition. Control transfers to query operation 220.

In query process operation 220, the system and/or method queries whether the face matching in process operation 215 is positive or negative. If the result of query is negative, then the process moves to process operation 265. If the result of the query is positive, then the process moves to process operation 230.

In process operation 265, the system and/or method warns the student of an identification verification issue having been sensed, or occurring. This issue could be, for example, that the faces do not still match after a minimum allowable mismatch time or that the image does not contain a pulse after a minimum allowable non-pulse time. This warning may occur over a period of time and could be a visual or audio warning. The administrator could set these minimal allowable mismatch times at their discretion. One skilled in the art will understand that this notification could be in any numerous types of alerts including, but not limited to, a yellow light, red light state, or an audible sound. During this block of time of being in a state of warning, the student has time to correct the issue. During this block of time control transfers to process operation 260.

In process operation 260, this negative event of query process 220 is logged and the issue is stored in a database for later analysis. At the end of the block of time, control transfers to query operation 255.

In query operation 255, the software/method queries whether the student has corrected the issue. If the issue is not corrected, control transfers to operation 250 and the test is ended. If the issue has been corrected, the system/process moves back to process operation 210. Another embodiment could include a setting where the administrator wants a test to end immediately if it finds cheating. Therefore the process could go from query operation 220 directly to operation 250. Another embodiment could include a setting where from query operation 220, it may proceed to operation 260 and then operation 250 such that the system could log the cheating or abnormality for future reference. Another embodiment could include a setting where the process could go from process operation 260 to process operation 210. In this embodiment, the test does not end, but each negative occurrence is logged for future analysis by a teacher or administrator.

If, on the other hand, the faces match in query operation 220, control transfers to process operation 230. In process operation 230, the system/process checks that the image is that of a live person and not a photograph placed in front of the camera. In one embodiment, confirming that an image is an image of a person and not a photograph of a person can be as rudimentary as checking whether the image changes over a period of time in small ways, which would indicate movement and hence a live person image.

In another embodiment of process operation 230, the process/method uses pulse detection software to make sure that the image is that of a live person and not a photograph clipped in front of the camera. Pulse detection software is also known in the art. One of several available pulse detection methods is motion magnification/modulation from Massachusetts Institute of Technology (MIT). MIT's motion modulation methods are described in US Patent Publication Nos. 2014/0072190, 2014/0072228 and 2014/0072229. In the extraordinarily rare event of a student who does not have a pulse, such as some users of a continuous-flow left ventricular assist device, this check can simply be turned off. Therefore, in this embodiment, GleimCheck software does more than just check if the image changes at all, as a change can be the result of lighting changes or the camera shaking as someone types because GleimCheck can ascertain whether the student or user has a heartbeat. Control then transfers to query operation 235.

In process query 235, the system/method queries whether the image reflects a detectable pulse. If process query 235 is positive, a pulse is detected, then the process moves to query process 238. If process query 235 is negative, then the process moves to process operation 265, described above.

In process operation 238, the system/method utilizes the GleimEyeCheck feature. GleimEyeCheck contains two alternative processes that the administrator or professor can choose between. They are either the eye gazing calibrated process, FIG. 9A, or the eye gazing uncalibrated process, FIG. 9B. These features are discussed in detail below. In one embodiment, the eye gaze calibration process can use the process described in FIG. 12 and discussed below. In another embodiment, both the eye gazing calibrated and eye gazing uncalibrated process can be used at the same time. Control then transfers to query operation 239.

In query operation 239, the method/system checks to see if it has detected eye gazing and/or whether there is a flag event in process operations 906 or 914. If yes to query operation 239, control transfers to process operation 265. If no to query operation 239, control transfers to query operation 240.

Note that queries 220, 235, and 239 may be conducted in any order. For example, operation 230 and query operation 235 could precede query 220, or process operation 238 and query operation 239 could precede query 220 or query 235.

In process query 240, the system/method queries whether the time on the exam has ended. If process query 240 is true, then the system/method proceeds to process end operation 250. If process query is false, then the system/method proceeds to process query 245.

In process query 245, the system/method queries whether the student has asked for the exam to end. If process query is true, then the system/method proceeds to end process operation 250. If process query is false, then the system/method proceeds to process operation 210. Note that operations 240 and 245 may be sequentially reversed.

Figure 3:
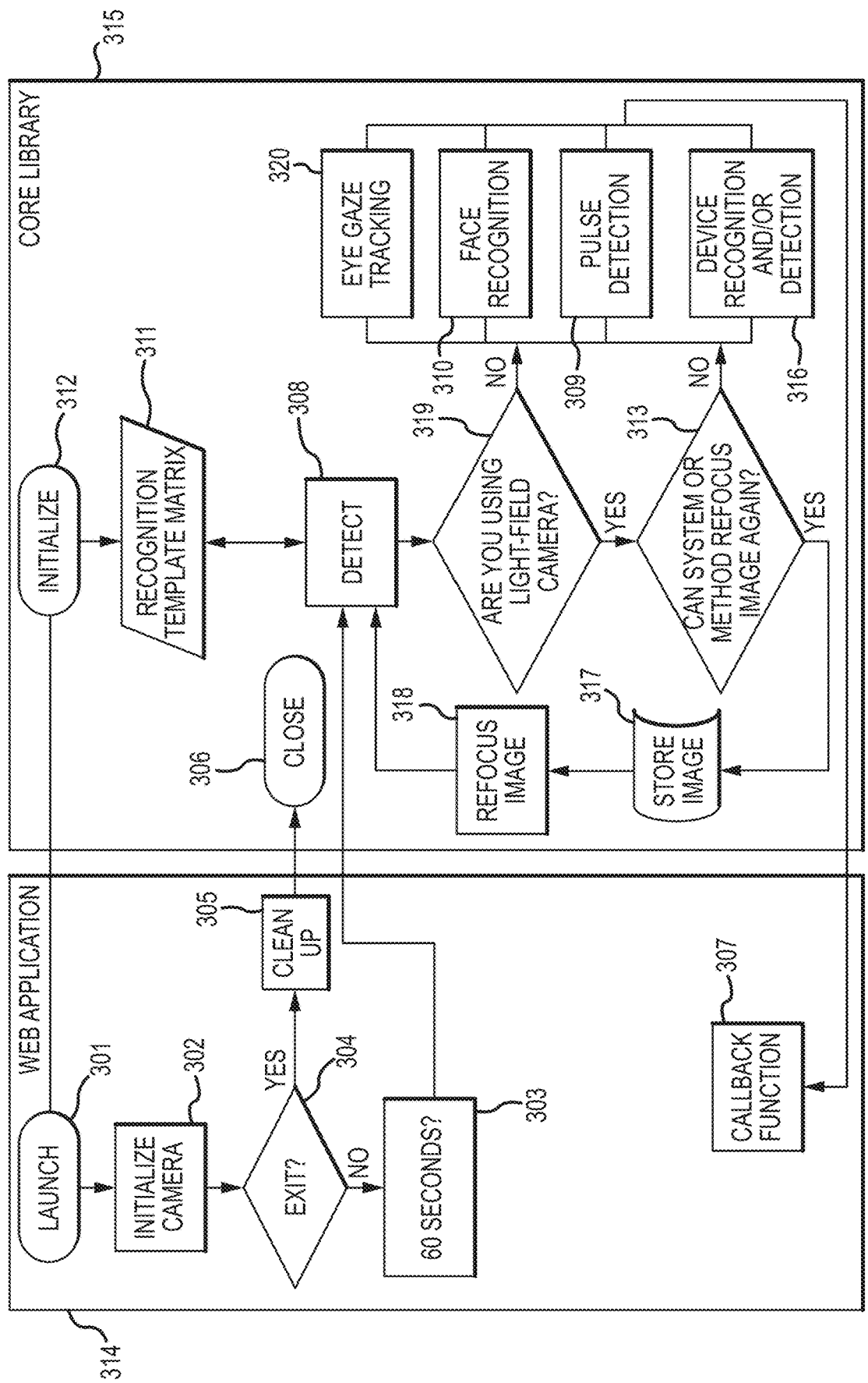
FIG. 3 is a flowchart of one embodiment of the process for Face and Pulse Detection Software Architecture within the GleimCheck Workflow described in FIGS. 2A and 2B.

FIG. 3 shows one embodiment of the face and pulse detection architecture. This architecture is divided into a web application 314 and a core library 315. Note that FIG. 3 references "camera" throughout and, as described above, "camera" is used for convenience, and could be any type of imaging device, such as has been described above.

Web application 314 is generated with Adobe Flash, though those skilled in the art will know that web application 314 could also be implemented with another Rich Internet Application such as JavaFX or Microsoft Silverlight, as a stand-alone application, or potentially with a widely accepted browser-based interface such as HTML5, JavaScript or WebGL.

In process operation 301, the web application 314 is launched. Control then transfers to operation 302.

In process operation 302, the web application initializes the camera (or other imaging device described above) and starts capturing images and video frames. Control then transfers through Exit query operation 304 to operation 303, assuming the answer in query operation 304 is No.

In process operation 303, the web application, for example, captures 3 seconds of video at 30 frames per second every 60 seconds and sends this information to the core library 315. In other words, in this example, 3 seconds of video out of every 60 seconds is captured and processed, so each second of captured video is allowed 20 seconds of processing time. This exemplary default duty cycle allows for a balance between power consumption, completeness of information, and consistent performance across older and newer hardware. One skilled in the art will realize that when three seconds of video can be processed in less than three seconds then the process can be run continuously. If a device is battery operated, running the device continuously may not be desired due to the power required. If a device is plugged into a wall, running the device continuously may not be desired if the device dissipates a significant amount of heat from continuous operation such as when a computer is placed on a user's lap. For a desktop device on wall power, continuous operation may provide the most convenience and optimal performance. Other duty cycles are possible. The three seconds out of 60 duty cycle can be easily adjusted manually or automatically.

In Exit query operation 304, the system/method checks if it is time to exit use of the camera. Such may be the case when allotted time period for the exam has expired or the student/user has asked to end the exam. In such a case, for example query process operation 304 equals yes, then control transfers, i.e., the system/method calls cleanup operation process operation 305.

In process operation 305, the system/method performs clean-up functions including shutting down the camera and signaling the core library to close by shifting control to process operation 306.

Web application 314 interacts with the user, sends information to core library 315, and receives information back from core library 315 via the callback function in operation process 307. It is core library 315 that performs image, test and location data comparison, and biometric processing.

Core library 315 is separated from web application 314 because it performs a different function. The core library 315 can be written in C and C++, which are very efficient at large amounts of processing, and then CrossBridge is used to cross-compile the code into Adobe AIR. It could also be compiled or cross-compiled in other platforms or Rich Internet Environments such as Microsoft SilverLight. Moreover, the core library could be written in many languages, including other languages that are efficient at computation and can be cross-compiled into a Low Level Virtual Machine (LLVM) language, including ActionScript, Ada, D, Fortran, OpenGL Shading Language, Haskell, Java bytecode, Julia, Objective-C, Python, Ruby, Rust, Scala and C #. The Core Library 315 interacts with the set of web applications through callback functions so that the web application and the core library can run on different platforms. In particular, the Core Library 315 can be run on the client, on the server, or the work can be divided between the client and the server based on what is most appropriate for each device.

In core library process operation 312, the core library is initialized by the process operation 301, which is the web application launch. Control then transfers to Matrix 311.

In Recognition Template Matrix 311, the system/method contains information about the Reference Images that may be retrieved from a server by the web application and provided as part of core library initialization. Control then transfers to library process operation 308.

In library process operation 308, the system/method finds the face in the image. In doing this, first in query operation 319, the system and or method queries whether the imaging device (e.g., camera) is a light-field camera. If yes, the process moves to query operation 313. If no, control transfers to process operations 310, 309, 316 and 320.

In query operation 313, the system and/or method queries whether the system or method can refocus the image again. If yes, then the process moves to process operation 317 where the refocused image is stored for later use. If no, the process moves on to process operations 310, 309, and 316. One skilled in the art understands that there are nearly an infinite number of light-fields (i.e., images) that can be refocused, but in practice there will be a limited number of refocus-able light-fields (i.e., images). Given the equipment being used or the way the off-the-shelf light-field technology is being utilized, there will be a fixed number of possible refocusing events and therefore a fixed number of possible images. Query operation 313 may preferably ensure that the system or method uses the highest number of refocus events that is practical, which means there will be the highest amount of useful images available for detection.

After process operation 317, control moves to process operation 318. In process operation 318, the image to be refocused is refocused using light-field camera technology. Control then moves to operation 308 and the process repeats until no further refocusing can be done. Control then transfers to verification operations 310, 309, and 316.

The face may be further divided into regions of interest. One such method that could be utilized in this manner is the Viola-Jones object detection framework. The region of the image containing the face or other information from the image is then provided to face recognition process operation 310 for comparison. The region of the image containing the face, a region containing a portion of the face such as a cheek or forehead, or other information from the image is also sent to library process operation 309 for pulse detection. The result of these processes is then returned to web application 314 via callback function 307.

In process operation 316, the system checks for images of known computer devices within each picture or image captured. For example, the system would recognize what an iPad looks like from a Reference Image of an iPad in the cloud, and if it identifies an iPad in the image operation 316 would register the device. The cloud would need to be updated with known device shapes that could be used, such as Google glasses, iPads, iPhones, android tablets, etc. This is to check if students are cheating by using other devices such as an iPad to look up answers during the validation session. For example, an exam may allow the use of HP Financial Calculators but not other calculators, mobile phones, or tablets, and this distinction could be made by object recognition software.

Process operations 309 (pulse detection) and 310 (facial recognition) are only some of the checks of validity that can be performed by the core library 315. In other embodiments, other tests are possible if other input, sensory or biometric devices are available. Consumer electronics can contain other sensors and biometric devices. If these are present, GleimCheck may choose to support them as well. In particular, some consumer electronics devices support fingerprint readers. Fingerprint readers often compare a fingerprint to one stored locally on the device. GleimCheck could store fingerprint data in the cloud. This data could be collected out-of-band, such as during the initial generation of a student ID, or scanned during a validated session. To validate this fingerprint, GleimCheck may store a copy of the fingerprint on a server and then validate it against the copy scanned from the individual.

Figure 7:
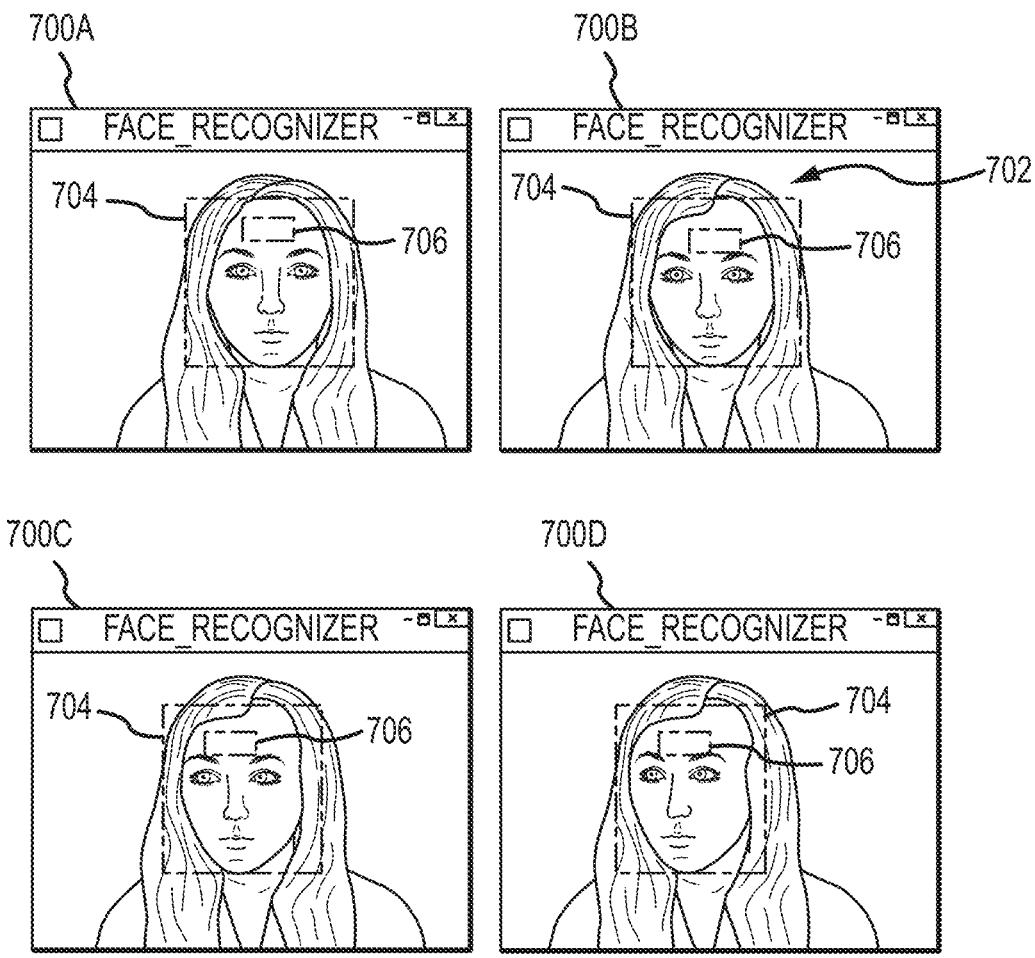
FIG. 7 illustrates a face recognition module operation in accordance with an embodiment of the present disclosure.

One example of a pulse detection or a face recognition operational sequence incorporating pulse detection in accordance with one embodiment of the present disclosure is shown in FIG. 7. Four exemplary sequential video image frames 700A, 700B, 700C and 700D of a student facing the computer and its camera are shown. Face detection and eye detection are initial functions within face identification operation 310. The coordinates of a box 704 defining the face are determined from the image found in each frame. In addition, the algorithm examines pixel relationships within the frame and determines the x and y coordinates of the eyes, and the height and width that define the box 704 around the face. This box 704 includes the x and y coordinates for the left eye and right eye.

The box 704 is then further examined to determine a forehead portion 706 using a predefined percentage according to the detected location of the face and the eyes. This forehead portion 706 is then cropped out and passed to the pulse detection module 309 as a "region of interest".

Figure 8:
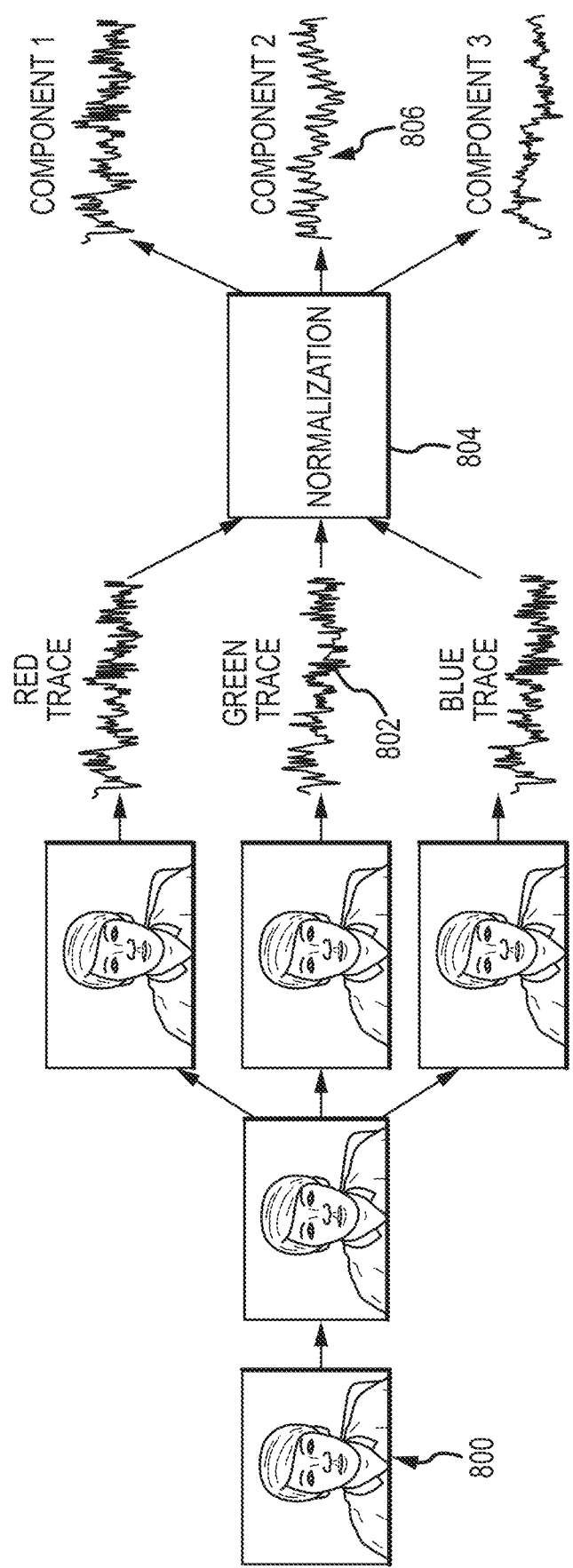
FIG. 8 illustrates a pulse rate determination module operation in accordance with an embodiment of the present disclosure.

This portion 706 of the box 704 is then compared with the same region in adjacent sequential video frames. Each region of interest 706 is used to estimate a pulse rate of the user. The algorithm separates the region of interest identified in each frame into three RGB (Red, Green, Blue) channels of the region of interest in an image 800 of a student as is shown in FIG. 8. In this example, the green channel measurement is used. The green channel waveform 802 is combined with a temporal averaging operation and normalization 804 to form a target trace 806. The dominant, or fundamental, frequency is then easily determined from the target trace 806. This dominate frequency approximates the pulse rate of the individual shown in the video frame 800. One skilled in the art will appreciate that the dominant frequency could also be described as the dominant peak in an FFT magnitude plot where FFT means a Fast Fourier Transform.

In another embodiment of this disclosure, a student may be issued or asked to purchase a device designed for the purpose of validating their identity. Such a device could be a web-camera with predetermined set of features, including a camera, infrared camera, microphone, 3D scanner, fingerprint reader, iris or other biometric scanner, or a radio frequency identification tag. In another embodiment, a student may be issued or asked to purchase a device designed for the purpose of listening to the sound in their test-taking environment. Such a device could be a microphone with predetermined set of features.

In core library process operation 320 another check of validity may be performed, called eye gaze tracking. In one embodiment, eye gaze tracking involves two steps. First, the direction of a viewer's pupil relative to a reference, typically the corner of the viewer's eye, is determined. We have already described above how an image can be divided into regions of interest and identified. Within a region of interest that contains the eye, the corner of the eye can be obtained by a method described by: Harris and M. Stephens (1988), "*A combined corner and edge detector*" (PDF), *Proceedings of the 4th Alvey Vision Conference*. pp. 147-151. The horizontal and vertical angle of the viewer's pupil is calculated relative to the corner of the eye utilizing this method.

In another embodiment core library process operation 320 could utilize the method described by Jianbo Shi and Carlo Tomasi (1993) in "Good features to track" rather than Harris and Stephens methodology. One skilled in the art recognizes that there are multiple methodologies that could be employed that achieve the same end.

One example of an eye gazing system in accordance with one embodiment of the present disclosure is shown in FIG. 9A. For ease of illustration, FIG. 9A, is discussed here, but typically this embodiment is completed within process operation 269 of FIG. 2A. This process first incorporates a calibration step. In operation 905 the user is asked to look at a reference image on the screen, typically in the upper left hand corner of the screen. The horizontal and vertical angle of the eye is then associated with that location on the screen. In process operation 910 the user is asked to look at an additional reference image on the screen, typically in the lower right hand corner of the screen. The horizontal and vertical angle of the viewer's eye is then associated with that location on the screen. In one embodiment, GleimEyeCheck analyzes only one eye (right or left). In another embodiment, GleimEyeCheck analyzes both eyes.

Process operation 910 may be repeated, asking the viewer to gaze at additional points on the screen, typically the remaining four corners of the computer screen. In an exemplary embodiment, GleimEyeCheck utilizes only 4 reference checks of the four corners of the screen. In another embodiment, GleimEyeCheck utilizes 5 points to 12 points of reference. Control then transfers to process operation 915.

One skilled in the art will appreciate that GleimEyeCheck is new and novel because current calibration methods typically suffer from two main issues. First, too many visual target points (usually more than 9) are required to generate satisfactory performance, which makes it inconvenient and tedious. Furthermore, it is unrealistic to ask users to look at visual target points in positions other than the four corners of a screen without manually labeling positions or having dedicated setups in a physical location, such as a computer lab. It is not realistic in many use cases, such as proctoring exams online, to use the current calibration methods, so a new methodology had to be invented. Second, the previous calibration methods are typically based on a single eye and, consequently, these methods disregard useful information provided with a person's second eye.

In process operation 915 the position of the viewer's gaze at or between these horizontal and vertical angles is used to calculate the current center of gaze on or off the screen. This center of gaze is sent to query operation 920. If the viewer is gazing at the screen, the process is repeated until it is interrupted. If the viewer's gaze is off the screen for a time or angle, or combination of time and angle exceeds the time flag threshold, then the gazing event is flagged for further review. In an embodiment of process operation 915, GleimEyeDetect (discussed below) is utilized to determine where the user is looking. GleimEyeDetect can output the coordinates (i.e., the direction of the stare) to query operation 920.

The results of this process are displayed in the several views shown in FIGS. 10A-H for an exemplary viewer. At operation 905 the viewer was asked to look at reference 1003. At operation 910 the viewer was asked to look at reference 1006. From these reference gazes it is determined that the computer screen is in position 1002 relative to the measurable gaze area 1001. FIG. 10B shows the gaze positions measured in 915. All of the gazes inside the screen area 1009 are considered on screen. Gaze area 1010 is off screen but below the flag threshold. Gaze position 1011 is above the flag threshold and the event has been flagged for further review. One should view these illustrations and descriptions as exemplary instead of in a limiting or restrictive sense.

To our knowledge all current calibrated eye tracking systems are used to try to determine where on the screen a user, or viewer, is gazing for the purpose of controlling a cursor with gaze tracking. This new method and system, GleimEyeCheck, described herein, is a unique process in that it is intentionally designed to track eye gazes that stray or purposely move off-screen rather than on screen. One deficiency of many existing calibrated eye gaze tracking systems, is that, due to the parallax effect, a small change in head posture can have a large change in calibration results. Most test takers are unlikely to maintain perfect posture throughout an entire assessment, resulting in large calibration errors. In the GleimEyeDetect system/method, our new and novel calibration system significantly mitigates this deficiency.

One example of an eye gazing system in accordance with one embodiment of the present disclosure is shown in FIG. 9B. This uncalibrated eye gaze tracking process removes the calibration step described in FIG. 9A. The calibration step is inconvenient to the user. Removing the calibration step also removes a deficiency in our embodiments, the calibration error caused by user motion, e.g., less than perfect viewer posture over time.

Process operation 945, shown in FIG. 9B, removes the calibration step and replaces it with a predetermined calibration generated from a typical person a typical distance from a typical computer. Because typical parameters have been substituted for actual parameters, the exact, calibrated corners of the screen are unknown. In the calibrated system the boundaries of the screen 1008 were known within the field of gaze 1007. In the uncalibrated system all that is initially measured is gaze points 1011 within the field of gaze 1012, but the boundaries of the screen are unknown.

In process operation 950, many gaze points are aggregated over time to form a pattern. In one embodiment, process operation 950 utilizes GleimEyeDetect to determine the gaze pattern. During the collection time, it is possible that the viewer/test taker may move slightly or change posture. This change in posture results in a slight change in the horizontal and vertical angles of the gaze at the same points on the screen. Since the motion of the viewer cannot always be completely compensated, it looks like the gaze points have moved slightly. This results in two sets of gaze points over the same time period. The set of gaze points before the change in posture has a pattern such as the one in FIG. 10C. The gaze points both before and after a change in posture is shown in FIG. 10C. FIG. 10D looks like a ghost of FIG. 10C superimposed on top of itself. Process operation 955 removes the ghost in order to determine the original pattern. The de-ghosting can be performed by comparing subsets of the gaze positions during shorter intervals of time to find the moment when the change in posture occurred and splitting the before and after time into different patterns, calculating the difference between the patterns and offsetting the ghost so that it is back on the other pattern, or by other statistical methods. The resulting de-ghosted pattern should once again look, for example, like FIG. 10C.

In process operation 985 a template of expected gaze patterns is available. The template of expected patterns could come from the patterns of other students. The initial template of expected patterns comes from the pattern of content on the screen during that time interval—it is expected that a student will spend their time examining the pictures, words, and numbers on a screen and not spend much time gazing at the blank space. FIG. 10C is the expected gaze pattern for a four question multiple choice test. The template of the expected pattern is scaled and shifted until it shows high correlation with the observed pattern. This has the interesting effect of implicitly determining the boundaries of the screen by having matched the gaze of the user to the known content on the screen.

In process operation 960 the expected gazes, those near or within the expected pattern, are removed. What remains are any gaze excursions—deviations from the expected gaze.

FIG. 10E shows a de-ghosted gaze pattern. FIG. 10F shows the de-ghosted gaze pattern after the expected pattern has been removed. In other words FIG. 10F is a gaze excursion.

The gaze excursion of FIG. 10F indicates a user/viewer who keeps looking down. For the initial gaze pattern generated from the screen, these gazes would not be in the template and these gazes would be flagged for further review. After review of these gaze excursions, it would be determined that all short answer questions should have these gaze excursions added to their template because many users look down at their fingers to type the responses to short answer questions. All the patterns of FIG. 10A-H together provide an example of the record for a multiple-choice question. One should view these illustrations and descriptions in an exemplary sense rather than in a limiting or restrictive sense.

FIG. 10F is the gaze excursion for a multiple choice question, which should not require a lot of looking straight down at the viewer's keyboard or lap to answer, so this excursion should and does get flagged. However, there are some math related multiple choice questions that may require students to use a writing utensil (e.g., pencil) and stationary (e.g., paper or marker board) to make calculations. For example, the American Institute of Certified Public Accounts' (AICPA) CPA Exam requires many CPA candidates to make calculations and then select the correct answer. In this type of situation or example, FIG. 10F may be applicable and the administrator or professor can denote this in the system/method, usually by submitting the information into the system via an input application when this individual submits the questions for the exam.

FIG. 10G shows the gaze excursion for someone who is using the mouse with their right hand and is using their left hand to flip through crib sheets. This excursion will be flagged.

FIG. 10H shows the gaze excursion for someone who moves their left hand between the keyboard and the mouse. The left hand movement was not in the original template made from the content on the screen. Right hand movement was added as a result of excursions from previous right-handed takers of that question. FIG. 10H shows that more than one expected template may be appropriate for each question or each test taker. Separate sets of templates can be applied for left handed and right handed individuals.

In one embodiment, GleimEyeCheck may be utilized as a standalone system/method without facial recognition or pulse detection (because an administrator or teacher may only want to ascertain whether test takers are gazing elsewhere). In such a stand-alone embodiment Reference Images and the like will not be pertinent because the intent of the process is to only verify that test takers are not eye gazing. Thus, query operations 201, 220, 235, and process operations 275, 215, 230, 309, 310, and 316 will not be necessary. In another embodiment, process operation 310 is necessary if this process operation is identifying regions of interest in the face, such as the location of the eyes and components of the eyes. One skilled in the art will appreciate that query operations 203 and 205 as well as process operation 204 are still necessary in this embodiment because, in addition to facial recognition, these operations are doing more than making sure facial recognition software will work; they are also ensuring the test takers eyes are visible to the system/method. In this case, in query operations 203 and 205 and process operation 204, this system/method allows for eye features to be emphasized and other facial features to be turned off or deemphasized.

In another embodiment, GleimEyeCheck may be utilized with facial recognition and not pulse detection. In this embodiment, process operations 230 or 309 as well as query operation 235 are not necessary. Control would pass through these operations to the next subsequent operation in the system or method.

In an embodiment, GleimEyeDetect is a significant component of GleimEyeCheck. In another embodiment, GleimEyeDetect can be run or operated as a stand alone operation. GleimEyeDetect is a new and novel single-webcam based eye gaze tracking system. This system/method utilizes a series of images, and/or video to analyze and track eye gazing. There are many different potential applications for eye gazing, i.e., utilizing images or video to analyze and track eye gazing. Some examples of potential applications are human machine interactions ("HMI") and gauging the attentiveness of graphical user interfaces. In general, most eye gazing applications are trying to gain a better understanding of how a person(s) is negotiating the visual world (i.e., where their eyes are on the screen). This presently disclosed application is less concerned with where the eyes are gazing at on the screen and, rather, is more interested in determining if the eyes are looking off of the screen. Therefore, the presently disclosed system is new and novel because it is utilizing eye gazing to determine something different from the typical eye gazing use cases: whether there is a likelihood that students are cheating on exams. If students are looking off of the screen or gazing at a single point without natural movement, there is circumstantial evidence that they may be trying to obtain information from unapproved test sources (e.g., cheat sheets, other electronic devices, friends, classmates, etc.) or they are using a dummy head in front of the camera to try and trick the Gleim EyeCheck and/or GleimEyeDetect systems/methods. In this case, flagged events are noted and a proctor or professor can investigate further on whether the student was, in fact, cheating.

Historically, image-based eye gaze tracking systems employ one of the two types of imaging techniques: 1) infrared imaging, and 2) visible imaging. Although high-contrast infrared images can significantly improve the resolution of eye regions (hence the accuracy of eye feature extraction), the high cost usually reduces the feasibility of widespread applications. One of the novelties of the presently disclosed system is that it can enable the validation of test takers using standard off-the-shelf technologies, which the students and administrators mostly already own and have enabled. Therefore, the presently disclosed system utilizes the visible image-based eye gaze tracking system because of its low cost for general public use.

While the presently disclosed system (GleimEyeDetect) is discussed in detail using visible imaging, one skilled in the art will appreciate that the same algorithms and methods could also be employed using infrared imaging. Thus, the GleimEyeDetect system/method is not limited to visible imaging and can also be used with infrared imaging. One should not view the detailed explanation of visible imaging as a limitation or in a restrictive sense to GleimEyeDetect.

Traditional visible imaging based eye gaze tracking systems can be broken into two different types: feature-based systems and appearance-based systems. To provide eye movement information, feature-based systems rely on the extraction of salient eye features, such as, the iris center, iris contour and/or eye corners. On the other hand, appearance-based systems employ the whole extracted eye regions to estimate visual gaze. GleimEyeDetect can utilize either feature-based systems or appearance-based systems. For ease of explanation, the presently disclosed system will go into detail below using a feature-based system for detailed discussion. One should not view the detailed explanation of using a feature-based system as a limitation or in a restrictive sense to Gleim EyeDetect.

Figure 12:
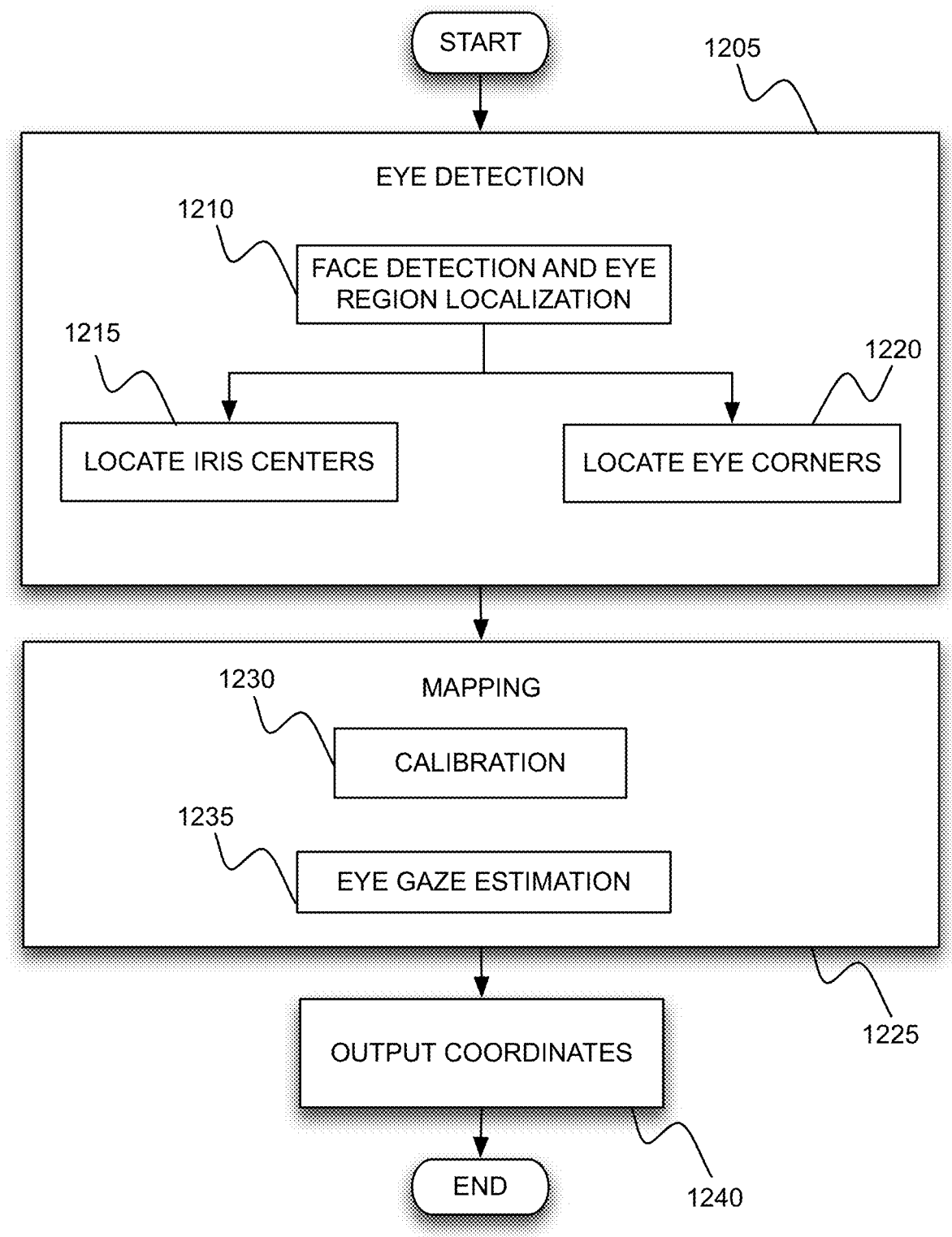
FIG. 12 is a process flowchart of the test taker eye gaze tracking process in accordance with the present disclosure.

An exemplary embodiment of using GleimEyeDetect begins in FIG. 12 where this system/method combines two main components: 1) a real time eye feature extractor and tracker which can accurately locate iris centers and eye inner corners, and 2) a precise mapping function between eye feature vectors (connecting iris center and eye inner corner) and screen coordinates. This system/method begins with process operation 1205.

In process operation 1205, the system/method performs the eye feature extractor and tracker methodology, which consists of process operations 1210, 1215, and 1220. One skilled in the art will appreciate that GleimEyeDetect's real time eye feature extractor and tracker component combines a state-of-the-art eye corner detector with an improved iris center locator over current mainstream technologies to extract eye feature vectors.

In process operation 1210, the system/method utilizes the well-known Viola-Jones object detection framework to detect the face and eye region(s) within an image or a series of images. One skilled in the art understands that any number of facial landmark detector toolkits can be used in process operation 1210 including, but not limited to, other proprietary and non-open sourced methods.

After the face region and eye region is determined, control transfers to process operation 1215 or 1220.

In process operation 1220, the system/method utilizes an eye inner corner detection approach. A large diverse number of eye inner corner detection approaches have been published. These approaches range from simple techniques based on the application of Harris corner detector to more sophisticated Active Shape Model ("ASM") or Active Appearance Model ("AAM") based approaches. One skilled in the art will appreciate that many problems in computer vision can be posed as nonlinear optimization problems. There are also different methods to solve these problems based on first and second order methods. One popular and powerful tool is Newton's method and its variants (e. g., Quasi-Newton methods). The traditional Newton method includes the need to compute the Hessian and the Jacobian at each step. These diverse approaches, such as ASM and AAM, have mainly concentrated on using Newton's method. In one embodiment, GleimEyeDetect can use any of these referenced eye inner corner detection approaches.

In another embodiment, process operation 1220 utilizes the fitting process of Supervised Descent Method ("SDM"). An exemplary embodiment of GleimEyeDetect uses SDM to detect and track eye inner corners across the whole video frames, because, compared with Newton's method and other approaches, the fitting process of SDM is extremely fast and SDM can also achieve greater accuracy.

Figure 13A:
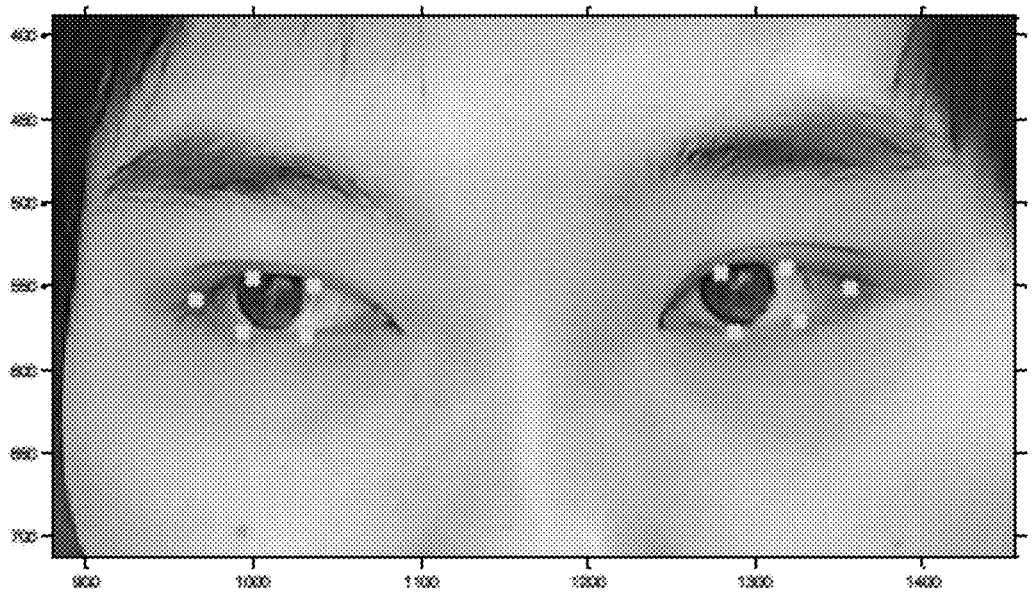
FIG. 13A is a photograph of a test taker's face with a front gaze showing detected eye corners.
Figure 13B:
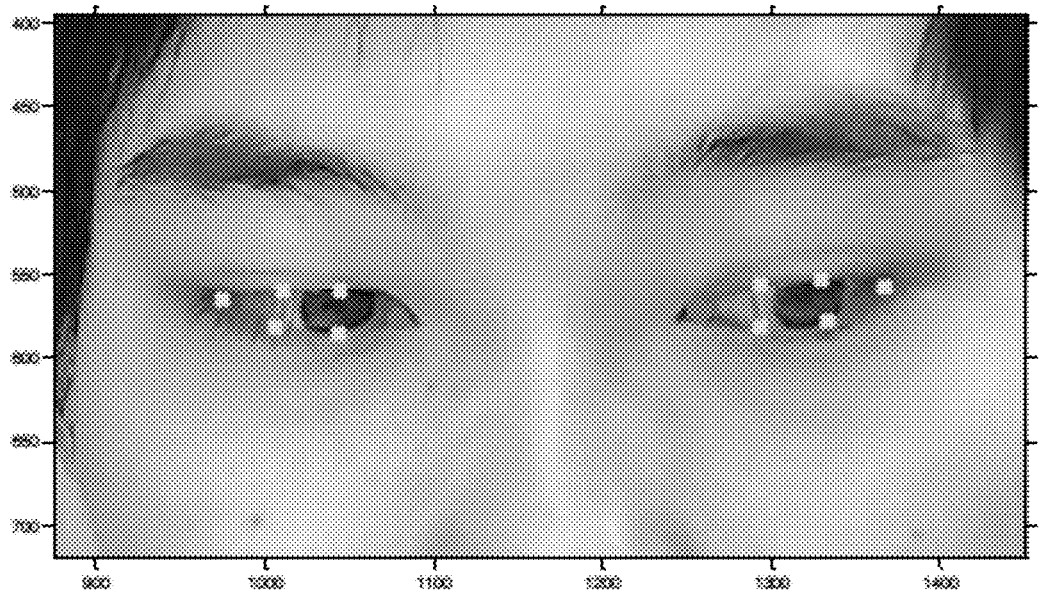
FIG. 13B is the photograph of a test taker's face with a diverted gaze showing detected eye corners.

In regards to process operation 1220, one embodiment of SDM is described by Xiong and De la Torre in "Supervised descent method and its applications to face alignment." An exemplary depiction is found in FIGS. 13A and 13B where eye inner corner detection results are displayed for two representative face images. GleimEyeDetect is new and novel because it applies SDM and uses only 6 landmarks to track the movement of sclera contours. The green crosses are the initial detected eye landmarks in the edges of eyelid using SDM, while the red asterisks mark the final corner locations. Normally, many landmarks (6, 12, or more) are used to model sclera contours in different applications and the intersection of two eyelid curves is considered to be the location of eye corners. One skilled in the art recognizes that SDM can detect and track 2 landmarks for each eye (i.e., each eye has 2 eye corners). An embodiment of process operation 1220 can utilize as few as 2 landmarks.

In another embodiment, process operation 1220 can utilize alternative sources of software instead of SDM. For example, an embodiment can use the landmark open-source implementation of facial landmark detector toolbox from The Center for Machine Perception at Czech Technical University in Prague. One skilled in the art understands that any number of facial landmark detector toolkits can be used including, but not limited to, other proprietary and non-open sourced methods.

After process operation 1220 is complete, control transfers to process operation 1215 unless it has already been completed. If process operation 1215 has already been completed, then control transfers to process operation 1225.

It is important to underscore that process operations 1210 and 1220 have been laid out individually for ease of explanation and illustration. In practice, these process operations can be combined into one process operation. Thus, in another embodiment, process operation 1205 can run process operations 1210 and 1220 simultaneously and afterwards control transfers to process operation 1215.

In one embodiment, after the system/method detects the face region and eye region in process operation 1210, control transfers to process operation 1215. In process operation 1215, the system/method (i.e., GleimEyeDetect) determines iris center. Several methods have been developed to determine iris center localization using visible-image feature-based systems. One skilled in the art recognizes that ordinary webcam images often suffer from low resolution and ambient noises and, consequently, accurate localization of pupil center is not feasible. Further, one skilled in the art recognizes that a majority of currently available methods determine the location of pupil centers prior to the localization of iris centers, especially for infrared images. In one embodiment, the system/method utilizes an infrared camera to capture eye images because infrared images allow more flexibility to extract iris centers since infrared images are much more clear and robust to ambient noises than natural images. In another embodiment, the system/method uses a natural image webcam.

In an exemplary embodiment of process operation 1215, the system/method utilizes Daugman's integro-differential operator to determine the location of the iris center (i.e., iris center localization). Control then transfers to process operation 1220. If process operation 1220 has already been completed, then control transfers to process operation 1225. After the system/method completes process operation 1220, it has also completed process operation 1205. Control then transfers to process operation 1225.

Once GleimEyeDetect determines (or finds) the eye corner(s), and iris center(s), it can map the movements and determine where the eyes are gazing. This step is called mapping and it is depicted in process operation 1225. One skilled in the art will appreciate that GleimEyeDetect's precise mapping function component uses a new and novel calibration mechanism based on binocular feature vectors, which can use as few as four (4) visual target points. One skilled in the art will appreciate that our complex model can handle as few as 4 visual target points while maintaining accuracy and dependability. Target points are the initial calibration points necessary for process operation 1230 to function well enough to provide the necessary inputs to process operation 1235 accurately. The current state of art uses formulas that need more than 4 target points to remain accurate and dependable. In one embodiment, the 4 target points are the four corners of a screen or monitor, including the screens of smartphones and computers.

Process operation 1225 is a combination of process operations 1230, and 1235. Thus, process operation 1225 begins with process operation 1230.

In process operation 1230, the system/method calibrates the users eye gaze. It is important to note that process operation 1230 is, in one embodiment, not run every time GleimEyeDetect is operated. Typically, process operation 1230 will run during initial calibration, such as when GleimEyeDetect is operated for process operation 269 and shown in FIG. 2A. However, the administrator (or proctor) may wish to re-run calibration at other points in time, so process operation 1230 may again be used during a test at the discretion of the administrator. When process operation 1230 is not being currently operated, the system/method will recall the information provided by the earlier calibration so the system/method can successfully complete process operation 1235.

In a real visual gaze estimation system, a typical calibration procedure presents the user a set of visual targets that he/she has to gaze at while the corresponding measurements, i.e., the screen coordinate ($S_x$, $S_y$) and its corresponding eye feature vector $e=e_{iris}-e_{corner}$ ($e_{iris}$ denotes the coordinates of iris center, while $e_{corner}$ denotes the coordinates of eye inner corner), are taken. From these correspondences, the mapping function T, which maps $e=[x,y]^T$ to ($S_x$, $S_y$), can be estimated. An exemplary depiction of this equation and the geometry can be found in FIG. 15A.

Different methods have been proposed to estimate T. Examples include linear model based methods such as Zhu and Yang's "Subpixel eye gaze tracking." On the other hand, there are polynomial model based methods, such as Morimoto et al in "Pupil detection and tracking using multiple light sources." In one embodiment, GleimEyeDetect can utilize either of these different methods.

However, many current calibration methods, including the ones referenced above, typically suffer from two main issues. First, too many visual target points (usually more than 9) are required for satisfactory performance, which makes it inconvenient, tedious, and unrealistic for most use cases. Second, they are based on a single eye, and disregard useful information provided by the second eye. However, binocular data can always improve the accuracy and robustness of eye gaze estimation. To overcome these two issues simultaneously, GleimEyeDetect utilizes a joint calibration mechanism, which utilizes only four visual target points and binocular feature vectors (so information from both eyes can be utilized).

Process operation 1230 can solve $e=[x,y]^T$ and ($S_x$, $S_y$) by using either a linear function or polynomial function. Because $S_x$ and $S_y$ become independent variables, it can be solved with least squares for x and y separately. In one embodiment, GleimEyeDetect can utilize the information from one eye. In this one-eye embodiment, after optimization, GleimEyeDetect's calibration mechanism is shown below.

$$T = \arg\min_T \sum_{i=1}^{N} \|L_i - Tg_i\|_2^2$$

In this equation, N is the number of visual target points (4 or more in GleimEyeDetect), $L=[S_x,S_y,0,0]^H$ and $g=[x,y,xy,1]^H$, where H denotes the transpose operator in linear algebra, i.e., both L and g are column vectors, $S_x$, $S_y$ are screen position coordinates and x, y are eye image feature coordinates.

In another embodiment, GleimEyeDetect can utilize the information from both eyes to calibrate the system/method. By providing the information from both eyes (or two eye vectors), GleimEyeDetect can provide more robust and accurate calibration. In this embodiment, after optimization, GleimEyeDetect's novel calibration mechanism is shown below.

$$T_{left}, T_{right} = \arg\min_{T_L, T_R} \sum_{i=1}^{N} \|L_i - T_{left} g_i^{left}\|_2^2 + \|L_i - T_{right} g_i^{right}\|_2^2 + \frac{1}{2}\|g_i^{right} - T_{right}^{-1} T_{left} g_i^{left}\|_2^2 + \frac{1}{2}\|g_i^{left} - T_{left}^{-1} T_{right} g_i^{right}\|_2^2$$

In this equation L and R (superscripts and subscripts) represent left eye and right eye, respectively. For example, $T_{left}$ denotes the coordinate mapping function (or transform) in the left eye, whereas $T_{right}$ denotes the coordinate mapping function (or transform) in the right eye. N represents the number of visual target points (N=4 in our system). $L_i$ denotes the coordinate information of the i-th visual point in the screen (i=1, 2, 3, or 4). (Please also refer to FIG. 15B). Similarly, $g_i^{left}$ denotes the coordinate information of the i-th visual point in the left eye, and $g_i^{right}$ denotes the coordinate information of the i-th visual point in the right eye. This equation also assumes the existence of a transform H that can transform the coordinates from the left eye to the right eye, and vice versa. It is important to note that a small disturbance nI (I is an identity matrix) is added on both $T_L$ and $T_R$, and n is fixed to $10^{-7}$ to avoid singularity. The above equation gets rid of the traditional first-order or second-order polynomial calibration functions used in majority of previous systems. The above equation describes the relationship between binocular eye features and screen coordinate mathematically. This equation is motivated with equation (6) in the paper "Improving Cross-Ratio-Based Eye Tracking Techniques by Leveraging the Binocular Fixation Constraint" by Zhengyou Zhang and Qin Cai. However, there are two differences: 1) the original paper uses glints as eye feature while our system uses the vector connecting iris center and eye corner as eye feature; and 2) the original paper estimates the mapping function from screen coordinate to eye feature, whereas our system estimates the mapping function from eye feature to screen coordinate.

Figure 15A:
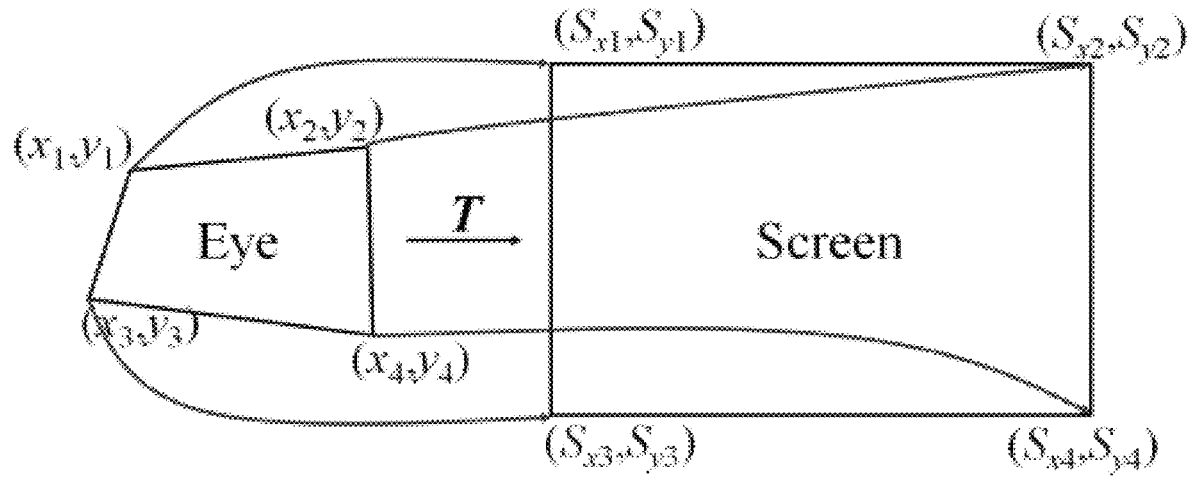
FIG. 15A is a diagram representing the geometry of a test taker's view of a screen.
Figure 15B:
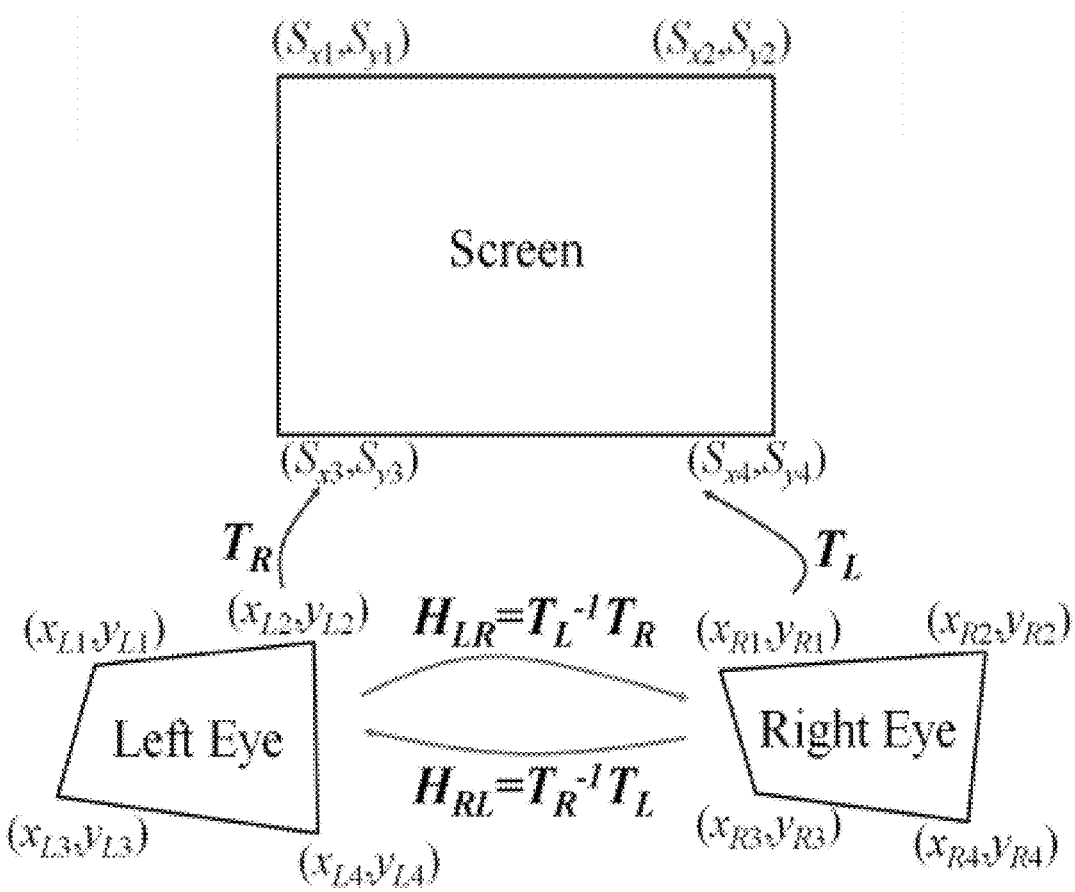
FIG. 15B is a diagram of correlation between a test taker's right and left eye.
Figure 16:
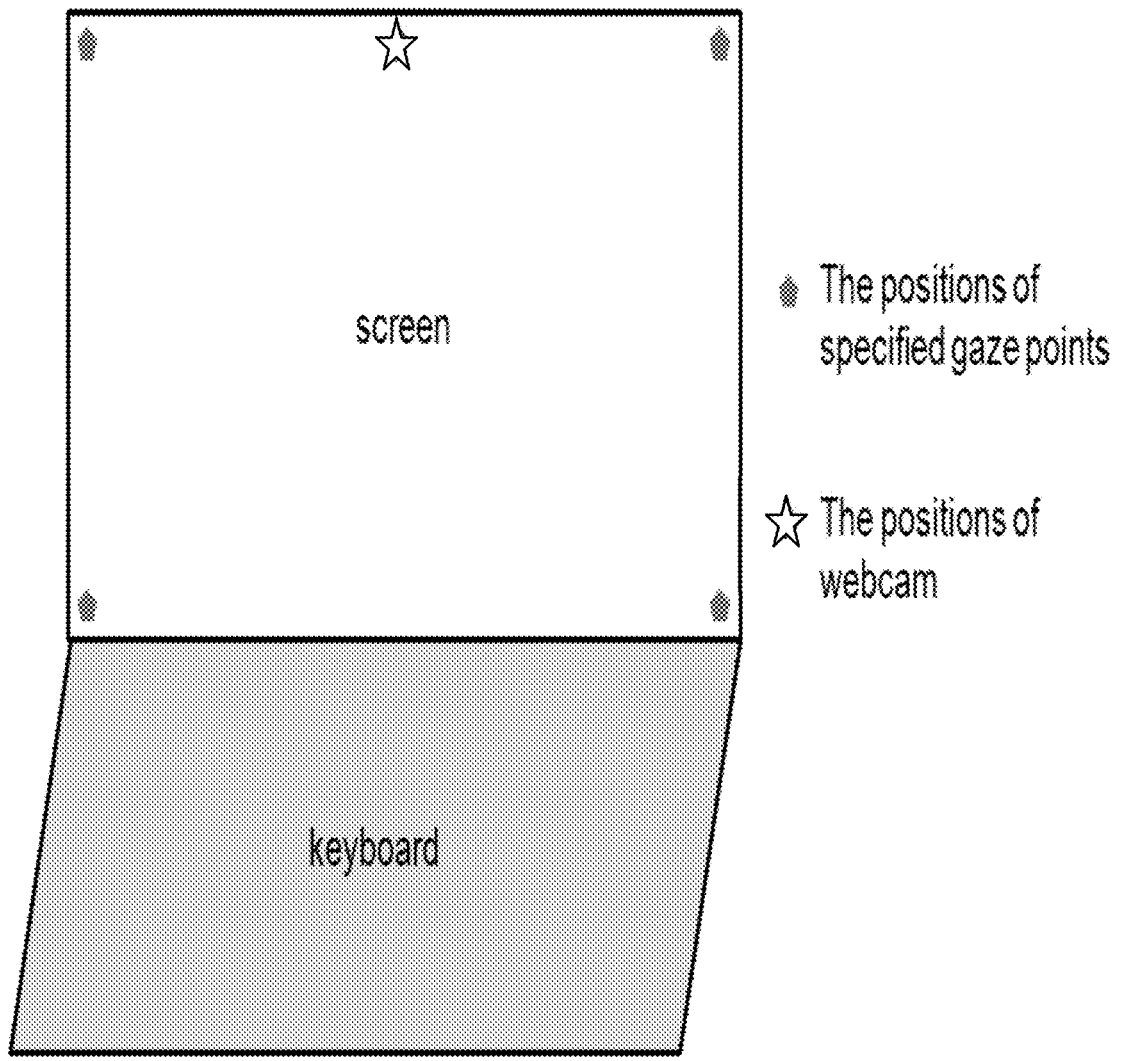
FIG. 16 is an exemplary diagram of a test taker's laptop computer with corresponding geometry of locations.
Figure 17:
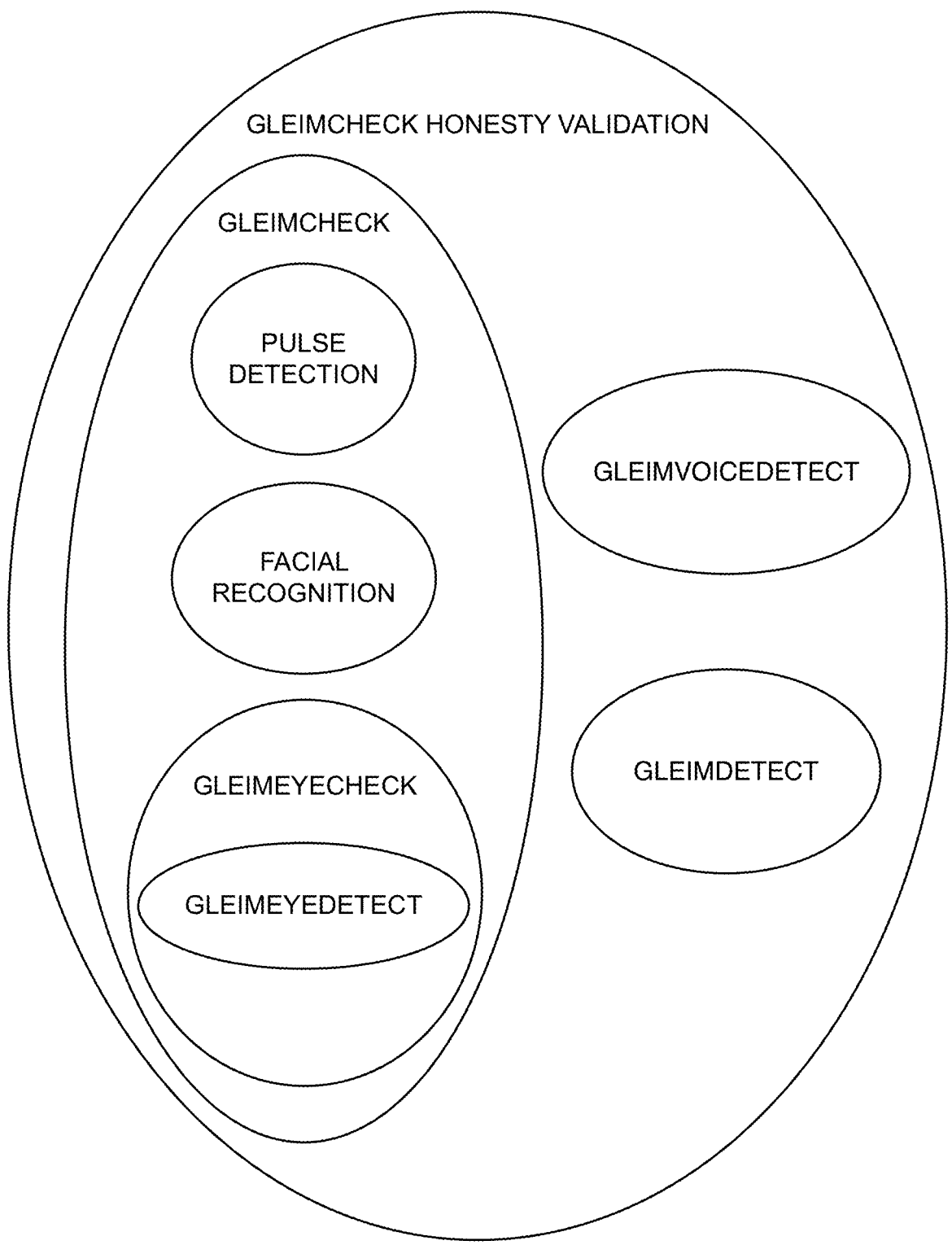
FIG. 17 is a Venn diagram of the GleimCheck Honesty Validation system in accordance with the present disclosure.

Process operation 1230 can be fully appreciated when depicted with a sense of geometry. FIG. 16 depicts the gaze geometry locations and webcam locations on a typical laptop computer screen. In an alternative embodiment the camera may be located above or adjacent to the monitor. FIG. 15A illustrates the basic paradigm for single-eye-based calibration. FIG. 15B depicts the geometry for Gleim EyeDetect's joint calibration based on binocular feature vectors.

After process operation 1230 is complete and GleimEyeDetect has calibrated where the users eyes are versus the webcam (or the screen), control then transfers to process operation 1235.

In process operation 1235, the system/method can compare where the users eyes currently are gazing and determine a geographical position of the users' eyes (or gaze). Thus, once the calibration procedure is performed, given the extracted two eye feature vectors in each image or video frame, GleimEyeDetect can obtain gaze point ($S_x, S_y$,) through the following equation provided below.

$$L = \arg\min_L \|L - T_L g^L\|_2^2 + \|L - T_R g^R\|_2^2$$

Figure 14A:
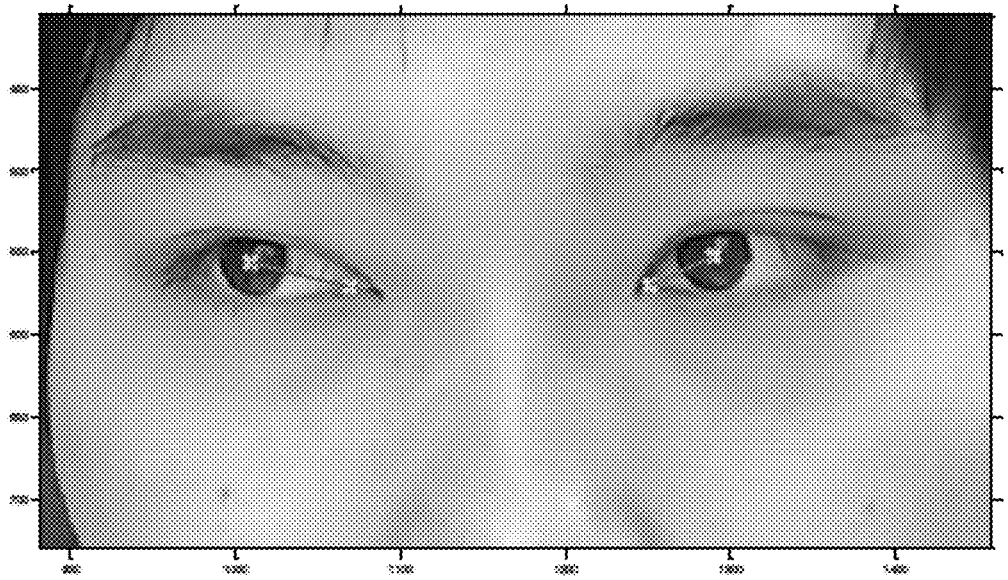
FIG. 14A is an image of a test taker's face with a front gaze showing an extracted eye feature vector connecting the iris center and the eye corner.
Figure 14B:
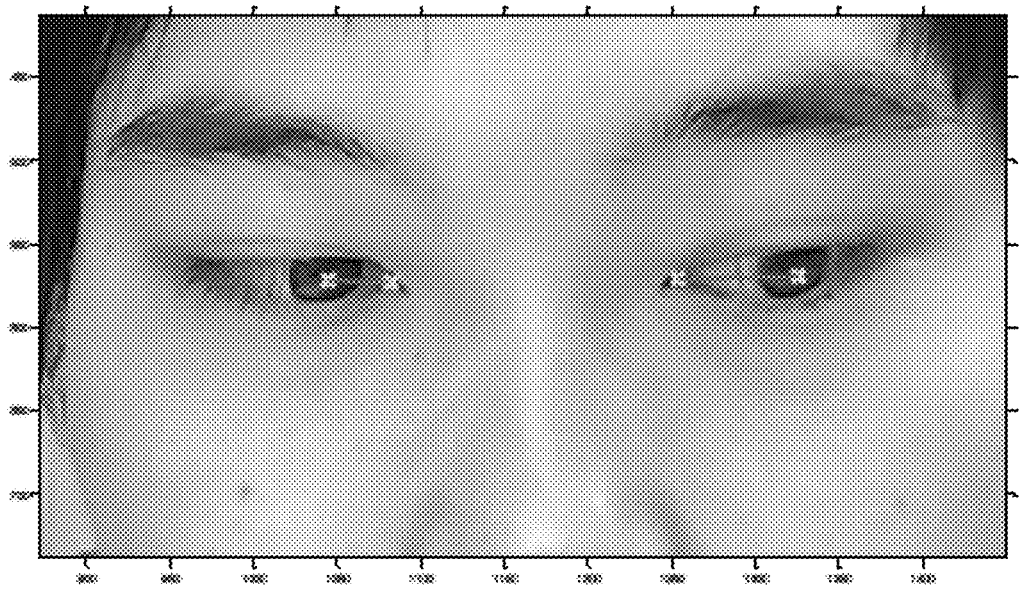
FIG. 14B is an image of a test taker's face with a diverted gaze showing the extracted eye vector connecting iris center and eye corner.
Figure 18A:
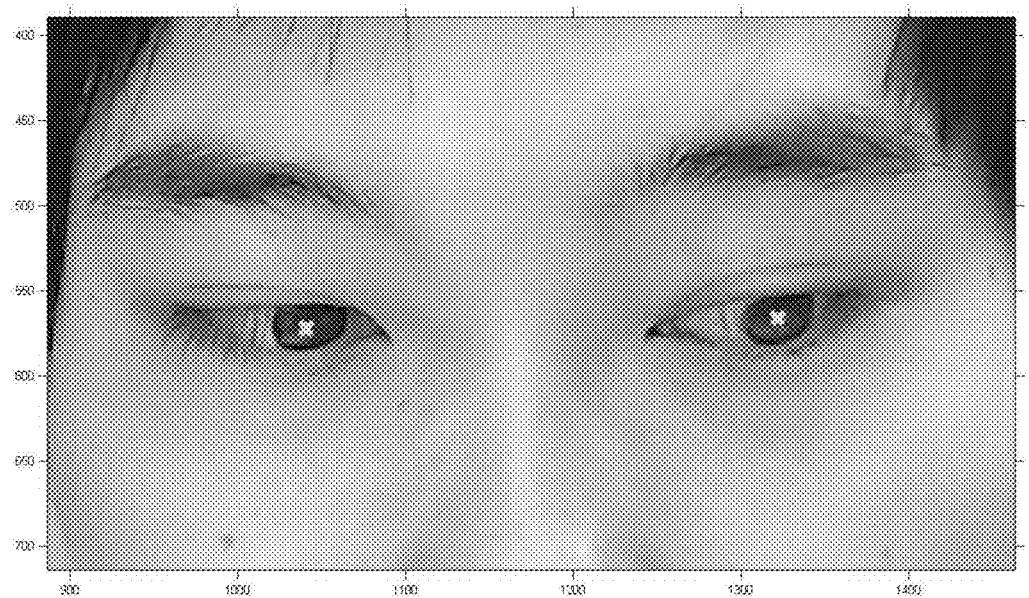
FIG. 18A is an image of a test taker's face with a front gaze showing the calculated iris centers.
Figure 18B:
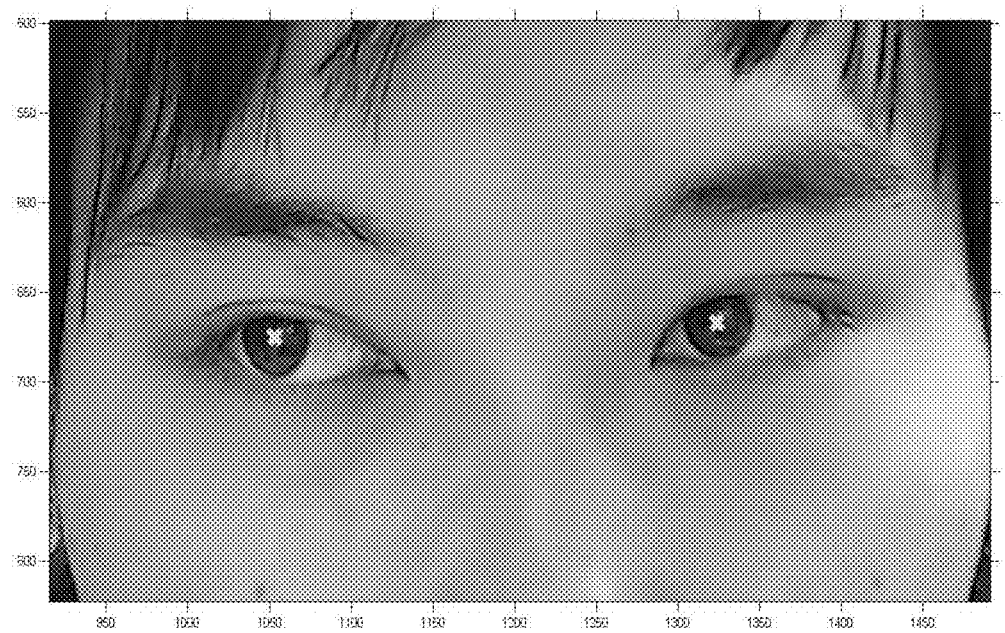
FIG. 18B is an image of a test taker's face with a diverted gaze showing the calculated iris centers.

FIGS. 14A and 14B are exemplary illustrations of how the system/method can generate a vector (or line) connecting the eye corner and iris center. FIGS. 18A and 18B illustrate the calculated iris centers for both a student's forward gaze and a diverted gaze, respectively, utilizing the above GleimEyeDetect calculations method. Control then transfers to process operation 1240.

In process operation 1240, GleimEyeDetect outputs, saves, and stores the information for future reference within Gleim EyeCheck or GleimCheck. Typically this information will be utilized in process operations 238 and 239 of FIG. 2B, and process operation 320 of FIG. 3.

GleimVoiceCheck ensures that test takers are not discussing or hearing information provided by a conspiring third party. GleimVoiceCheck is a speaker recognition system/ method that can ascertain whether anyone's voice other than the appropriate test taker can be heard. One skilled in the art understands that speaker recognition systems require a voice print, voice template, or model voice. In other words, speaker recognition systems need a reference sample of an individual's voice ("Reference Voice"). Once a speaker recognition system has a Reference Voice there are two types of speaker recognition systems, programs, or methods. First, a speaker verification (or speaker authentication) system authenticates whether a voice is a particular person's voice. This type of system/method looks for a 1:1 match. A second type of speaker recognition system/method is a speaker identification system where a computer analyzes a voice to determine who is speaking. This type of system tries a 1:N match where the voice is compared against N Reference Voices. GleimVoiceCheck has the capabilities of being both types of speaker recognition systems.

Figures 11A, 11B:
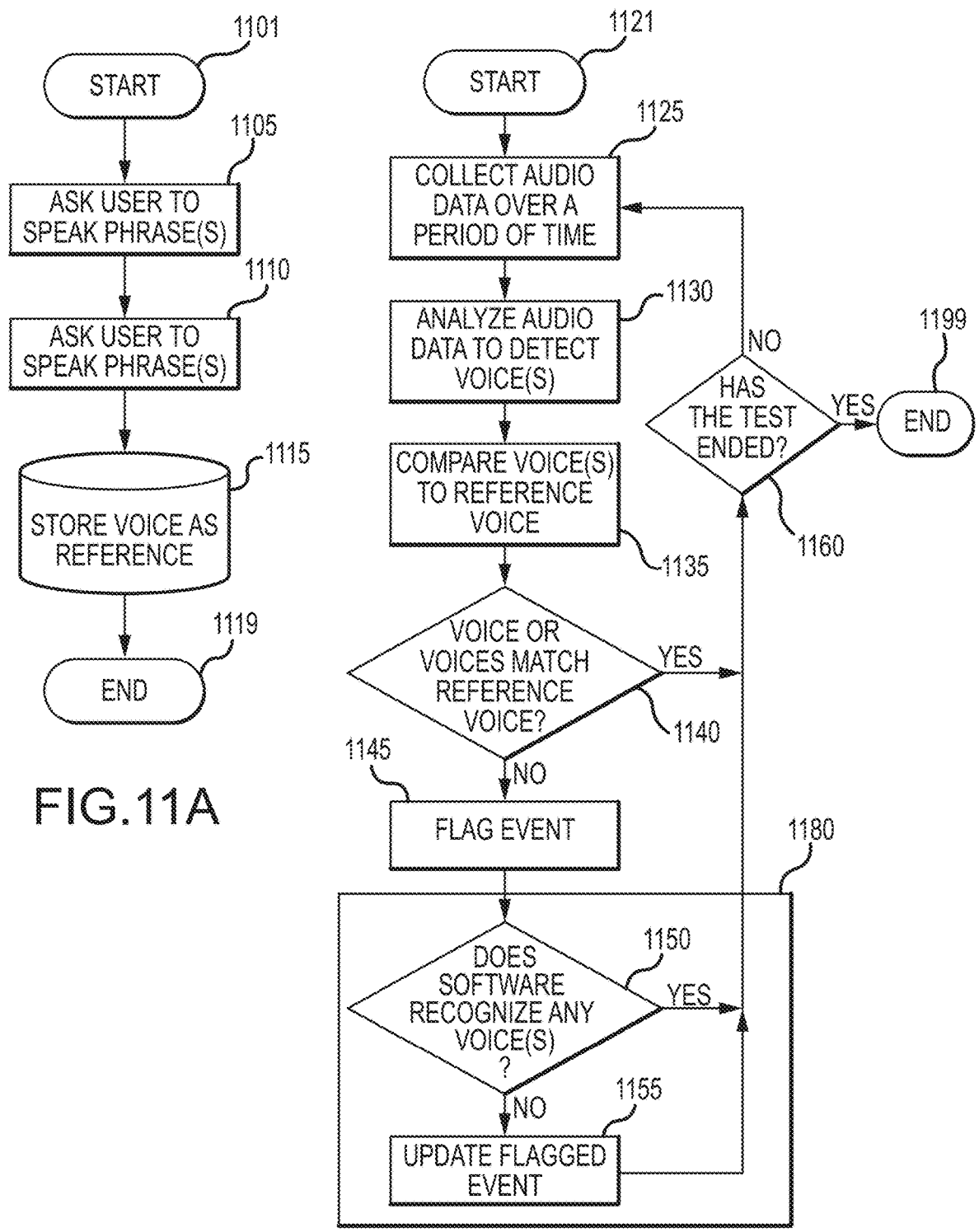
FIG. 11A is a flowchart that illustrates a reference voice storage process for a test taking user.
FIG. 11B is a flowchart that illustrates the voice recognition process using the stored test taker voice determined in accordance with the flowchart shown in FIG. 11A.

FIGS. 11A and 11B show one embodiment of the GleimVoiceCheck architecture. FIG. 11A is the process for having the method/system know a test taker's Reference Voice. The entire system/method discussed in FIG. 11A can be completed either immediately prior to a test or in process operation 11, which is shown in FIG. 1. If the administrator chooses to have this completed immediately prior to a test, the user or test taker would complete the process as shown in FIG. 11A during process operation 15, which is shown in FIG. 1.

In process operation 1105, the method/system asks the student, test taker, administrator, or participant to speak a phrase or phrases. The more sounds from a particular user's voice, the more accurate GleimVoiceCheck will become. However, there are diminishing returns to more sample voice sounds, so an administrator can simply limit the amount of phrases he or she wishes the user to submit. In another embodiment, the system/method can alert the user when it has a sufficient voice sample (i.e., Reference Voice). Control then transfers to process operation 1115.

In process operation 1115, the voice recorded in process operation 1105 becomes the Reference Voice and is stored for future reference by the system or method. Control then transfers to process operation 1119 and ends.

FIG. 11B shows the process of how the system/method performs ongoing verification within process operation 16, which is shown in FIG. 1. This process can run concurrently with or without GleimCheck.

In process operation 1125, the system/method collects audio through the user's microphone. The audio data is transmitted over the Internet or network and is collected by the system/method. Control then transfers to process operation 1130.

In process operation 1130, the voice data under goes speaker diarization (or diarisation), which is the process of breaking an audio stream into segments according to a speaking identity. By performing this process, speaker recognition software is better able to determine who is speaking. There are many options for speaker diarisation software including, but not limited to, ALIZE Speaker Diarization, SpkDiarization, Audioseg, and SHoUT. GleimVoiceDetect can use any number of speaker diarization programs and the previous examples should be viewed in an illustrative sense rather than a limiting sense. Control then transfers to process operation 1135.

In process operation 1135, the voice or voices are compared to the Reference Voice. The system/method will utilize a speaker recognition software program. There are a multitude of speaker recognition software packages available to use in GleimVoiceCheck including, but not limited to, ALIZE, Julius, Kaldi, and CMU Sphinx. ALIZE was initiated by the University of Avignon-LIA in 2004. Control then transfers to query operation 1140.

In query operation 1140, the system/method queries whether the voice or voices match the Reference Voice. If yes to query operation 1140, control transfers to query operation 1160. If no to query operation 1140, control transfers to process operation 1145.

In process operation 1145, the segment of audio is flagged for the teacher or administrator to review, if desired. Moreover, this information can be saved in a database for future reference. In another embodiment this alert or flag could be a visual alert or an audible alert. Control then transfers to process operations 1180.

Process operation 1180 is a speaker identification application within GleimVoiceDetect. This process is doing more than verifying whether the student is the one speaking. It is also checking its database to see whether the voice is a recognized voice. In an embodiment, process operation 1180 can be turned on or off at the discretion of the administrator or teacher. Process operation 1180 includes both query operation 1150 and process operation 1155.

In query operation 1150, the system/method compares the voice or voices found in process operation 1125 to known Reference Voices stored in the system/method's database. If the system/method determines any match or matches, then control transfers to process operation 1155. If the system/method does not determine any match or matches, then control transfers to query operation 1160.

In query operation 1160, the system/method queries whether the test has ended. If yes to query operation 1160, then control transfers through process operation 1199 and ends. If no to query operation 1160, then control transfers to process operation 1125.

The method and system in accordance with the present disclosure combines authentication at the beginning of a test with authentication throughout the duration of a test. Thus, in addition to validating an individual's identity at the start of the session, their identity is validated continuously throughout the session. This assures that a photo of the user is not being used to trick the system while another person impersonates the validated user. Just checking if the image has changed is often not enough to solve this problem, as a change can indicate common conditions including, but not limited to, a change in lighting conditions and camera shake. Alternatively, rather than continual authentication during the test, images may be taken at predetermined intervals and stored for later analysis and verification once the test has been completed. This could be done in a batch process after everyone in the class has taken his or her exam, for example, because many online exams provide their students a multi-day timeframe to choose the exact time they take their exam (e.g., 2-3 hours).

The Graphical User Interface of GleimCheck can include a feedback pane or screen where a student or user can verify that they are verified. Verification can require some lighting (when using a visible light camera) and that the user's face is within view of the camera. Below the image of the user will be a display graphical user interface, such as a traffic light, that will help display the quality of the imagery being verified. One skilled in the art will understand that this graphical user interface need not be below a person, but could be anywhere on the screen. Moreover, one skilled in the art will understand that a visual graphical display need not be used, but an auditory alert could also be used, or both a graphical alert and auditory alert could be used in unison or concurrently. In an embodiment using a traffic light for a graphical user interface, a green light means that the user's identity is verified. A yellow light means that the user needs to adjust lighting or repoint the camera to get back to green light. A red light means that the user is not currently verified. One skilled in the art will understand that there are many types of graphical user interfaces that could be used and a traffic light is just one example.

In addition to validating the identity of each individual, GleimCheck Honesty Validation can check or ascertain if individuals are collaborating on assignments that are supposed to be completed individually. GleimDetect checks the correlation between users' locations, incorrect answers, and the time of those events to determine if individuals have been collaborating.

An embodiment of a process/method for collaboration detection in accordance with the present disclosure, referred to in operation 17 of FIG. 1, is shown in the flow diagram of FIG. 4. The process includes both instructor workflow 416 and student workflow processes 417. The instructor workflow process begins in operation 401 in which a professor, instructor, or administrator starts a workflow. Control then transfers to operation 402.

In process operation 402, the instructor or administrator creates a pool of test/quiz questions. Control then transfers to operation 403.

In process operation 403, the instructor or administrator selects if (s)he would like the order of the questions to be randomized. A randomized question order can make cheating more difficult but may also make the flow of the test more difficult. A non-randomized order makes cheating easier to perform and potentially easier to detect. Control then transfers to operation 404.

In process operation 404, the instructor, administrator or the computer can choose to test with a subset of all the questions from the test pool; one reason to do this may be to create tests with different question sets without the change in sequence caused by randomizing the question order. Process control then transfers to operation 405.

In process operation 405, the instructor or administrator provides any known relationship between students; for example, if multiple students are on the same sports team and are assigned the same tutor, it might be expected that their answers correlate differently than a random sampling of students. Process control then transfers to operation 406.

In process operation 406, the instructor or administrator launches the test, quiz, or exam and it becomes available to students, either immediately or during a scheduled set time or scheduled set of times.

In process operation 415, the instructor or administrator receives any red flags generated by the student(s) or user(s). These flags may be received either as they are generated or these red flags can be generated in a batch form and stored for review in one or more reports at a later time(s).

The student workflow 417 begins when a student starts the test in process operation 407. Control then triggers two (2) process operations to begin in parallel-process operation 408 and process operation 411.

In process operation 408, each of the student's or user's answers and the time of when each answer was made is saved until the test time expires in process operation 409 and/or the student is done in process operation 420. Optionally, this information can be saved and referenced at a later date or time.

In process operation 410, the answers and their answer times are then compared across test takers. This comparison is preferably a statistical analysis. One skilled in the art will understand that there are a wide variety of statistical analysis options in the public domain that could be utilized in process operation 410 including, but not limited to, scantron analysis, Monte Carlo Simulation, Belleza and Belleza's "Detection of Cheating on Multiple-choice Tests by Using Error-Similarity Analysis, or Scheck software based on Wesolowsky's "Detecting Excessive Similarity in Answers on Multiple Choice Exams."

In process operation 411, the system/method tracks and saves the location of the student/user. One skilled in the art will understand that there are many location type of distinctions provided by browsers and software. For example, a web camera or video camera may provide a GPS location. Therefore, if a camera is being utilized during the test, such as when a professor or administrator requires Web Application 314 and Core Library 315, then the system/method may obtain GPS information on the student's or user's location.

In another embodiment of process operation 411, an Internet Protocol address provides location information that can be stored and used to gather information about a student(s) or user(s).

In another embodiment of process operation 411, a Wi-Fi router can provide information to the system/method. If multiple users are utilizing the same Wi-Fi router, it may provide information on whether a group or cluster of student(s) or user(s) are cheating, collaborating, or conspiring together. In an embodiment, the system/method may query the browser or application to provide Wi-Fi router information. Once the location or locations being tracked are saved, control transfers to operation 412.

In process operation 412, the uniqueness of the web browser being utilized by the student or user is tracked and saved. This information can be used at a later time, such as in process operation 413, to determine if other students or users utilized the same browser. Browser uniqueness can be defined as information a web browser provides or shares with any website the browser visits and this information can be unique. One skilled in the art knows that there are multiple software packages available to analyze and provide data on how unique each browser is. For example, one can use the Electronic Frontier Foundation's Panopticlick project ("How Unique Is Your Web Browser?" by Peter Eckersley). One skilled in the art understands that there are many browser uniqueness software packages available and many are held as proprietary trade secrets. One using this disclosure could use any one of these browser uniqueness methods. Once the browser uniqueness is saved, control transfers to operation 413.

In process operation 413, the browser and location are compared across test takers. In an embodiment, Internet Protocol address, Wi-Fi router information, and GPS information from a camera all provide location data for process operation 413. Control then transfers to operation 418.

In process operation 418, the answer uniqueness is compared to the location and browser uniqueness to determine which students are likely to be collaborating. This comparison check is preferably a statistical analysis. One skilled in the art will understand that there are a wide variety of statistical analysis options in the public domain that could be utilized in process operation 418 including, but not limited to, probability analysis and Monte Carlo Simulation. Probability analysis may include many of the same examples stated above. Control then transfers to operation 414.

In process operation 414, any red flags generated in process operation 418 are provided to the instructor and saved along with the supporting data, e.g. answers, times and locations for subsequent review and analysis if needed. Control is shifted to process operation 415.

The GleimCheck Honesty Validation software is initially available for Windows PC, Macs, and other devices capable of supporting a webcam and Adobe Flash Player. One skilled in the art will know that in addition to implementation on a Windows PC or Mac, GleimCheck Honesty Validation could be implemented as a mobile phone app, an app that does not require Adobe Flash Player, an app for a smartphone, tablet, Windows Phone, Android phone, iPhone, iPad, virtual reality or augmented reality headset, or other electronic device. One skilled in the art will also understand that HTML5 or Adobe AIR can also be used for GleimCheck Honesty Validation. In another embodiment, the components of GleimCheck Honesty Validation (GleimCheck, pulse detection, Gleim Detect, Gleim EyeCheck, GleimEyeDetect, and GleimVoiceDetect) can individually also be implemented on these same hardware and software platforms.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), or random access memory. In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Figure 5:
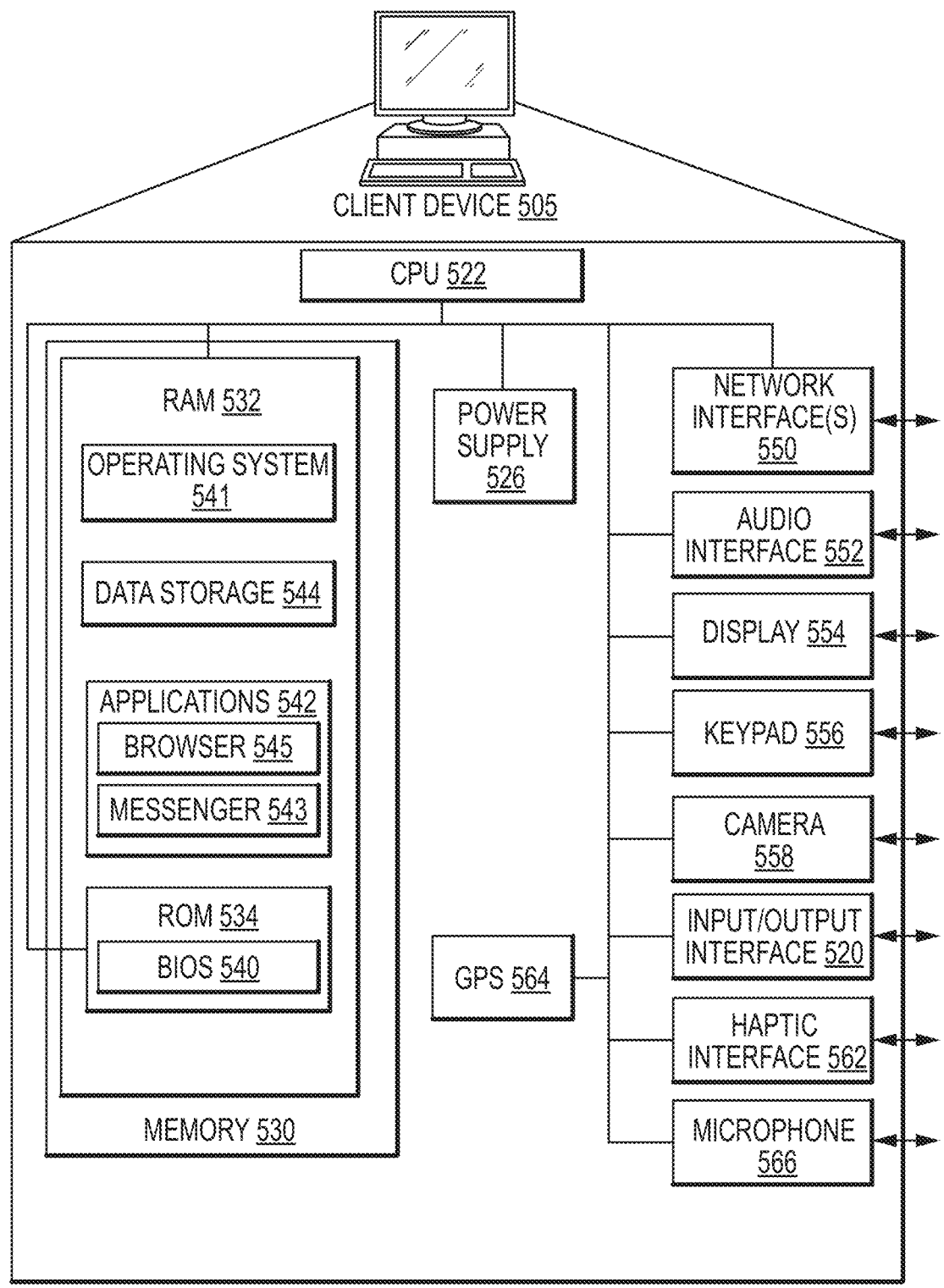
FIG. 5 is a representation of a client device utilized in an embodiment of the process of the present disclosure

FIG. 5 shows one example of a schematic diagram illustrating a client device 505 upon which an exemplary embodiment of the present disclosure may be implemented. Client device 505 may include a computing device capable of sending or receiving signals, such as via a wired or wireless network. A client device 505 may, for example, include a desktop computer, a tablet computer, or a laptop computer, with a digital camera, smartphone, and/or augmented reality glasses. The client device 505 may vary in terms of capabilities or features. Shown capabilities are merely exemplary.

As shown in the example of FIG. 5, client device 505 may include one or more processing units (also referred to herein as CPUs) 522, which interface with at least one computer bus. A memory 530 can be persistent storage and interfaces with the computer bus. The memory 530 includes RAM 532 and ROM 534. ROM 534 includes a BIOS 540. Memory 530 interfaces with the computer bus so as to provide information stored in memory 530 to CPU 522 during execution of software programs such as an operating system 541, application programs 542 such as device drivers (not shown), and software messenger module 543 and browser module 545, that comprise program code, and/or computer-executable process steps, incorporating functionality described herein, e.g., one or more of process flows described herein. CPU 522 first loads computer-executable process steps from storage, e.g., memory 532, data storage medium/media 544, removable media drive, and/or other storage devices and may involve data retrieval and communication via wireless components. CPU 522 can then execute the stored process steps in order to execute the loaded computer-executable process steps. Data storage medium/media 544 is a computer readable storage medium(s) that can be used to store software and data and one or more application programs. Persistent storage medium/media 544 can also be used to store device drivers, such as one or more of a digital camera driver, monitor driver, printer driver, scanner driver, or other device drivers, web pages, content files, playlists and other files. Client device 505 also preferably includes one or more of a power supply 526, network interface 550, audio interface 552, a display 554 (e.g., a monitor or screen), keypad 556, an imaging device such as a camera 558, I/O interface 520, a haptic interface 562, a GPS 564, and/or a microphone 566.

Power supply 526 provides power to Client device 505. A rechargeable or non-rechargeable battery may be used to provide power. The power may also be provided by an external power source, such as an AC adapter or a powered docking cradle that supplements and/or recharges a battery.

Audio interface 552 is arranged to produce and receive audio signals such as the sound of a human voice. For example, audio interface 552 may be coupled to a speaker and microphone (not shown) to enable telecommunication with others and/or generate an audio acknowledgement for some action. Display 554 may be a liquid crystal display (LCD), gas plasma, light emitting diode (LED), or any other type of display used with a computing device. Display 554 may also include a touch sensitive screen arranged to receive input from an object such as a stylus or a digit from a human hand.

Keypad 556 may comprise any input device arranged to receive input from a user. For example, keypad 556 may include a push button numeric dial, or a keyboard. Keypad 556 may also include command buttons that are associated with selecting and sending images.

Memory 532 further includes one or more data stores, which can be utilized by Client device 505 to store, among other things, applications and/or other data. For example, data stores may be employed to store information that describes various capabilities of Client device 505. The information may then be provided to another device based on any of a variety of events, including being sent as part of a header during a communication, sent upon request, or the like. At least a portion of the capability information may also be stored on a disk drive or other storage medium (not shown) within Client device 505.

Applications may include computer executable instructions which, when executed by Client device 505, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications may further include a search client that is configured to send, to receive, and/or to otherwise process a search query and/or search result using any known or to be known communication protocols. Although a single search client is illustrated it should be clear that multiple search clients may be employed. For example, one search client may be configured to enter a search query message, where another search client manages search results, and yet another search client is configured to manage serving advertisements, Ns, emails, and other types of known messages, or the like.

Figure 6:
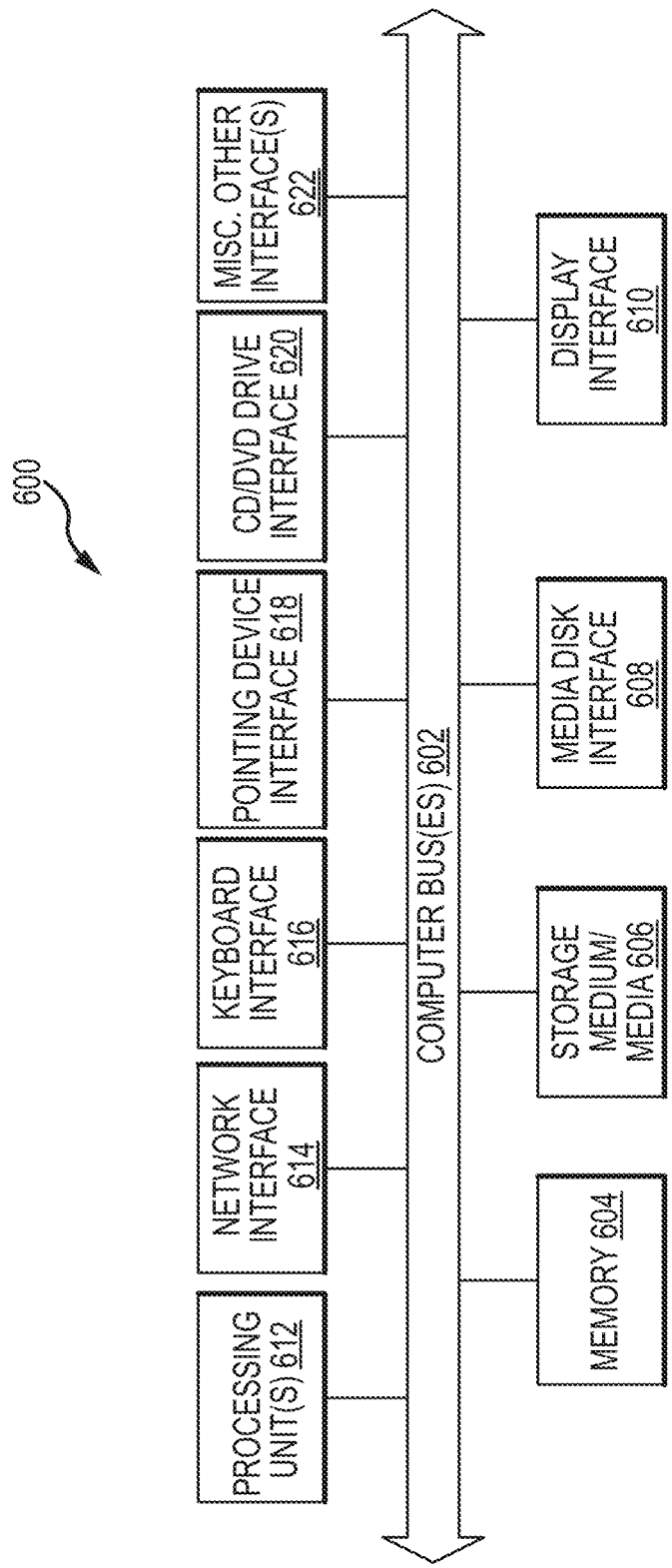
FIG. 6 is a block diagram of a system utilizing an embodiment of the present disclosure.

FIG. 6 is a block diagram illustrating an internal architecture 600 of an example of a computer, such as server computer and/or client device, utilized in accordance with one or more embodiments of the present disclosure. Internal architecture 600 includes one or more processing units (also referred to herein as CPUs) 612, which interface with at least one computer bus 602. Also interfacing with computer bus 602 are persistent storage medium/media 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, CD/DVD drive interface 620, and miscellaneous other interfaces 622, such as a camera interface, Bluetooth interconnectivity, microphone, webcam, infrared camera, parallel and serial port interfaces, a universal serial bus (USB) interface, Apple's ThunderBolt and Firewire port interfaces, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

As described above, persistent storage medium/media 606 is a computer readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

The GleimCheck Honesty Validation is composed of multiple systems/methods. For ease of the reader, FIG. 18 is a Venn diagram showing how these component system/methods can interrelate. Each component can be operated or run independently. Thus, if one component is shown as a subcomponent, this subcomponent could be operated or run without the other "parent" components. Therefore, FIG. 18 is an illustrative example of how one embodiment of the GleimCheck Honesty Validation system/method could be utilized. This figure should be regarded in an illustrative sense to help the reader understand the components rather than in a restrictive sense.

Throughout this disclosure, reference has been made to the term gaze. It is to be understood that gaze is an interchangeable term and synonym for glare, watch, stare, examine, browse, glimpse, and scan. Furthermore, it is to be understood that gazing is an interchangeable term and synonym for glaring, watching, staring, browsing, scanning, and examining.

Throughout this disclosure, reference has been made to the term eye gazing. Eye gazing is more than merely the gaze of the eyes; it also can determine attentiveness, attention, interest, boredom, difficulty, or simplicity of a computer screen. In one embodiment, eye gazing can help determine the boredom, difficulty, and simplicity of a test, exam, or homework assignment, including specific problems or questions.

Throughout this disclosure, reference has been made to flags or red flags. It is to be understood that these terms are one in the same and interchangeable. Moreover, flags could be notations in a database, alerts that are sent to the proctor or administrator at a later time, and/or could be real time alerts. If flags are alerts, they could be in the form of visual cues or audio cues to the administrator or proctor. These visual cues could be in flashing colors, colors displayed similar to a vehicle traffic light, or plain text. These audio cues could be any form of sound that would alert an administrator or proctor to an issue. Finally, visual cues and audio cues could be used simultaneously or in any order.

The event of a flag could be triggered by a mismatch in voice versus the Reference Voice or after a minimum allowable mismatch time that the users gaze is out of the ordinary and not on the screen. Flags could also occur after a mismatch between the face in an image versus the Reference Image or if an image does not contain a pulse after a minimum allowable non-pulse time. The administrator could set these minimal allowable mismatch times at his or her discretion.

Although the disclosure has been provided with reference to specific exemplary embodiments, it will be evident that the various modification and changes can be made to these embodiments without departing from the broader spirit as set forth in the claims. For example, while the above disclosure is directed toward a user taking an exam or test, the disclosed system and method may also be utilized for monitoring completion of homework assignments and other projects that can be administered and completed on-line. Furthermore, in many of the user interactions described above, the system and method queries can be implemented by an event driven system/method where an event notice is received and handled by an event handler. In such an instance, for example, instead of system/method querying a user if they have completed an exam, the user presses an "exit" or "I am done" icon/button, which sends the system an appropriate instruction or alert. Accordingly, the specification and drawings are to be regarded in an illustrative sense rather than in a restrictive sense.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A computer implemented method of validating test taker honesty during administration of a test comprising:

positioning a test taker in front of a computer display connected to a camera and to a processor;

obtaining via the camera communicating with the processor an image of the test taker looking at the display including both eyes of the test taker;

determining, via the processor analyzing the image, a first eye feature vector for a first of the test taker's eyes wherein the first eye feature vector includes a distance between an iris center and an inner corner of the first eye;

determining, via the processor analyzing the image, a second eye feature vector for the second of the test taker's eyes, wherein the second eye feature vector includes a distance between an iris center and an inner corner of the second eye;

determining, via the processor utilizing a mapping function relating both of the eye feature vectors to coordinates of the computer display, a binocular eye gaze for the test taker corresponding to the test taker viewing a boundary of the computer display;

calibrating the test taker's binocular eye gaze utilizing both eye feature vectors, utilizing an equation:

$$T_{left}, T_{right} = \underset{T_L, T_R}{\mathrm{argmin}} \sum_{i=1}^{N} \left\| L_i - T_{left} g_i^{left} \right\|_2^2 + \left\| L_i - T_{right} g_i^{right} \right\|_2^2 + \frac{1}{2} \left\| g_i^{right} - T_{right}^{-1} T_{left} g_i^{left} \right\|_2^2 + \frac{1}{2} \left\| g_i^{left} - T_{left}^{-1} T_{right} g_i^{right} \right\|_2^2$$

where "left" and "right" represent left eye and right eye, respectively, where $L=[S_x, S_y, 0, 0]^H$, $g=[x, y, xy, 1]^H$, where $N>=4$; and where H denotes a transpose operator in linear algebra, $S_x$, $S_y$ are screen position coordinates and x, y are eye image feature coordinates;

monitoring the test taker's binocular eye gaze via the camera and the processor while the test taker is taking an online test; and setting a flag if the test taker's eye gaze moves beyond the boundary of the display during the online test.

2. The method according to claim 1 wherein determining the test taker's eye gaze includes having the test taker look at each of four corners of the computer display and calculating, via the processor, a position on the display relative to the test taker's eye gaze.

3. The method of claim 1 further comprising determining when the online test is complete and resetting the flag if the online test was complete when the test taker's binocular eye gaze moved beyond the boundary of the display.

4. The method according to claim 1 further comprising:

collecting, test taker eye gaze positions of the test taker positioned in front of and looking at the computer display connected to the processor and the camera during a predetermined period of time;

subtracting, via the processor, a template of expected eye gaze patterns from the collected test taker eye gaze positions during administration of the online test;

querying whether test taker eye gaze positions deviate beyond a predetermined excursion threshold during the online test; and setting a flag if the test taker eye gaze positions exceed the predetermined threshold during the online test.

5. The method according to claim 4 further comprising:

comparing the collected test taker eye gaze positions during a predetermined period of time to an expected set of collected gaze positions to detect a test taker's change in posture; and de-ghosting the set of collected eye gaze positions to reestablish test taker's expected eye gaze positions.

6. A method of validating test taker honesty during administration of an online test comprising:

collecting, via a camera connected to a processor, an image including both eyes of a test taker in front of and looking at a computer display;

determining, via the processor automatically analyzing the image, an eye feature vector for a first eye of the test taker wherein the eye feature vector includes a distance between an iris center and an inner corner of the first eye;

determining, via the processor automatically analyzing the image, a second eye feature vector for the second eye of the test taker wherein the second eye feature vector includes a distance between an iris center and an inner corner of the second eye;

collecting an eye gaze angle for the first eye feature vector and the second eye feature vector of the test taker in front of and looking at the computer display;

determining, via the processor utilizing a mapping function relating the eye feature vectors to coordinates of the computer display, a binocular eye gaze for the test taker corresponding to the test taker viewing a boundary of the computer display;

calibrating the test taker's binocular eye gaze utilizing both eye feature vectors utilizing an equation:

$$T_{left}, T_{right} = \underset{T_L, T_R}{\mathrm{argmin}} \sum_{i=1}^{N} \left\| L_i - T_{left} g_i^{left} \right\|_2^2 + \left\| L_i - T_{right} g_i^{right} \right\|_2^2 + \frac{1}{2} \left\| g_i^{right} - T_{right}^{-1} T_{left} g_i^{left} \right\|_2^2 + \frac{1}{2} \left\| g_i^{left} - T_{left}^{-1} T_{right} g_i^{right} \right\|_2^2$$

where "left" and "right" represent left eye and right eye, respectively, where $L=[S_x, S_y, 0, 0]^H$, $g=[x, y, xy, 1]^H$, where $N>=4$; and where H denotes a transpose operator in linear algebra, $S_x$, $S_y$ are screen position coordinates and x, y are eye image feature coordinates;

determining, via the processor, a target of the test taker's binocular eye gaze from the position of the test taker and the eye gaze angles;

collecting a pattern of eye gaze targets over time;

comparing, via the processor, the pattern of eye gaze targets to a predetermined pattern of acceptable eye gaze targets to determine a comparison difference;

setting a flag if the comparison difference exceeds a threshold during the online test.

7. The method of claim 6 further comprising:

having the test taker gaze at a predetermined set of positions on the computer display to develop an excursion threshold; and querying whether test taker eye gaze positions deviate beyond the excursion threshold during the online test.

8. The method of claim 6 further comprising:
estimating the target of the eye gaze from the position of the test taker and the eye gaze angle via a predetermined or queried set of information about camera field of view, a predetermined set of assumptions about typical head sizes and viewing distances without having the test taker gaze at a predetermined set of positions to develop an excursion threshold; and
determining whether the test taker's eye gaze position has deviated beyond an acceptable threshold during the online test using a statistical test.

9. The method of claim 8 further comprising wherein the statistical test comprises:
subtracting a pattern of expected eye gaze patterns from the test taker eye gaze pattern collected during administration of the online test to derive a resulting pattern; and
comparing the resulting pattern to a predetermined set of acceptable gaze patterns.

10. The method of claim 9 wherein the comparing utilizes a correlation test such as a scaled correlation.

11. The method of claim 9 wherein the predetermined pattern is generated from gaze patterns of previous test takers.

* * * * *

UNITED STATES PATENT AND TRADEMARK OFFICE
CERTIFICATE OF CORRECTION

PATENT NO. : 10,885,802 B2
APPLICATION NO. : 15/226757
DATED : January 5, 2021
INVENTOR(S) : Gleim et al.

It is certified that error appears in the above-identified patent and that said Letters Patent is hereby corrected as shown below:

In the Specification

In Column 4, Line 31, delete "is" and insert -- is a --, therefor.

In Column 10, Line 56, delete "may" and insert -- many --, therefor.

In Column 12, Line 22, delete "can been" and insert -- can be --, therefor.

In Column 14, Line 18, delete "Gleim Detect," and insert -- GleimDetect, --, therefor.

In Column 14, Line 61, delete "Gleim Detect)" and insert -- GleimDetect) --, therefor.

In Column 15, Line 5, delete "2-3 hour" and insert -- 2-3 hours --, therefor.

In Column 15, Line 30, delete "Gleim U" and insert -- GleimU --, therefor.

In Column 20, Line 39, delete "and or" and insert -- and/or --, therefor.

In Column 22, Line 2, delete "dominate frequency" and insert -- dominant frequency --, therefor.

In Column 24, Line 16, delete "FIG. 10C." and insert -- FIG. 10D. --, therefor.

In Column 24, Line 56, delete "FIG." and insert -- FIGS. --, therefor.

In Column 25, Lines 1-2, delete "American Institute of Certified Public Accounts' (AICPA)" and insert -- American Institute of Certified Public Accountants' (AICPA) --, therefor.

In Column 26, Line 10, delete "Gleim EyeCheck" and insert -- GleimEyeCheck --, therefor.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,885,802 B2

In Column 26, Line 48, delete "Gleim EyeDetect." and insert -- GleimEyeDetect. --, therefor.

In Column 30, Line 6, delete "$g_j^{left}$" and insert -- $g_i^{left}$ --, therefor.

In Column 30, Line 7, delete "$g_j^{right}$" and insert -- $g_i^{right}$ --, therefor.

In Column 35, Line 14, delete "Gleim Detect, Gleim EyeCheck," and insert -- GleimDetect, GleimEyeCheck, --, therefor.

In Column 37, Line 21, delete "Ns," and insert -- IMs, --, therefor.

In Column 38, Lines 6-7, delete "system/methods" and insert -- systems/methods --, therefor.